US011160072B2

(12) United States Patent
Golitschek Edler von Elbwart et al.

(10) Patent No.: US 11,160,072 B2
(45) Date of Patent: Oct. 26, 2021

(54) SPECIAL SUBFRAME CONFIGURATION FOR LATENCY REDUCTION

(71) Applicant: Panasonic Intellectual Property Corporation of America, Torrance, CA (US)

(72) Inventors: Alexander Golitschek Edler von Elbwart, Hessen (DE); Lilei Wang, Beijing (CN); Ayako Horiuchi, Osaka (JP)

(73) Assignee: Panasonic Intellectual Property Corporalion of America, Torrance, CA (US)

(*) Notice: Subject to any disclaimer, the term of this patent is extended or adjusted under 35 U.S.C. 154(b) by 267 days.

(21) Appl. No.: 16/089,279

(22) PCT Filed: Mar. 31, 2016

(86) PCT No.: PCT/CN2016/078098
§ 371 (c)(1),
(2) Date: Sep. 27, 2018

(87) PCT Pub. No.: WO2017/166195
PCT Pub. Date: Oct. 5, 2017

(65) Prior Publication Data
US 2020/0314840 A1    Oct. 1, 2020

(51) Int. Cl.
*H04W 72/04* (2009.01)
*H04L 5/00* (2006.01)
*H04W 74/08* (2009.01)

(52) U.S. Cl.
CPC ....... *H04W 72/0446* (2013.01); *H04L 5/0044* (2013.01); *H04W 72/042* (2013.01); *H04W 74/0833* (2013.01)

(58) Field of Classification Search
CPC ........... H04W 72/0446; H04W 72/042; H04W 74/0833; H04L 5/0044; H04L 5/0092; H04L 5/0053
See application file for complete search history.

(56) References Cited

U.S. PATENT DOCUMENTS 9,407,419 B2    8/2016 Yang et al.
9,743,394 B2    8/2017 Yang et al.
(Continued)

FOREIGN PATENT DOCUMENTS

CN    101567773 A    10/2009
CN    103369692 A    10/2013
(Continued)

OTHER PUBLICATIONS

3GPP TS 36.211 V8.9.0, "$3^{rd}$ Generation Partnership Project; Technical Specification Group Radio Access Network; Evolved Universal Terrestrial Radio Access (E-UTRA); Physical channels and modulation (Release 8)," Dec. 2009, 83 pages.
(Continued)

*Primary Examiner* — Saumit Shah
(74) *Attorney, Agent, or Firm* — Seed IP Law Group LLP

(57) ABSTRACT

The present disclosure relates to receiving and transmitting data in a frame with subframes of a wireless communication system, each subframe being either an uplink subframe accommodating uplink signal, a downlink subframe accommodating downlink signal or a special subframe including a downlink signal portion as well as an uplink signal portion. A control signal includes a special subframe configuration specifying the length of the uplink and/or downlink portion of the special subframe. The mapping and demapping of user data and/or control data including feedback information in a transmission time interval, TTI, onto or from one subframe is then performed, wherein the length of a second TTI for mapping onto the uplink portion of a special
(Continued)

subframe is shorter than a first TTI for mapping onto an uplink subframe, or a first number of TTIs mapped onto the uplink subframe is larger than a second number of TTIs for mapping onto the uplink portion of a special subframe. The data are received or transmitted accordingly.

14 Claims, 18 Drawing Sheets

(56) References Cited

U.S. PATENT DOCUMENTS

| | | | |
|---|---|---|---|
| 2012/0135773 A1* | 5/2012 | Shen | H04L 5/0053 455/513 |
| 2013/0083736 A1* | 4/2013 | Yin | H04W 72/0446 370/329 |
| 2014/0086119 A1 | 3/2014 | Yang et al. | |
| 2015/0085797 A1* | 3/2015 | Ji | H04J 13/10 370/329 |
| 2016/0330720 A1 | 11/2016 | Yang et al. | |
| 2019/0036676 A1* | 1/2019 | Takeda | H04W 72/0446 |
| 2019/0150075 A1 | 5/2019 | Hayashi et al. | |

FOREIGN PATENT DOCUMENTS

| | | |
|---|---|---|
| CN | 103636149 A | 3/2014 |
| WO | 2014/133320 A1 | 9/2014 |
| WO | 2016/002441 A1 | 1/2016 |

OTHER PUBLICATIONS

3GPP TS 36.211 V12.8.0, "3$^{rd}$ Generation Partnership Project; Technical Specification Group Radio Access Network; Evolved Universal Terrestrial Radio Access (E-UTRA); Physical channels and modulation (Release 12)," Dec. 2015, 136 pages.
3GPP TS 36.212 V12.7.0, "3$^{rd}$ Generation Partnership Project; Technical Specification Group Radio Access Network; Evolved Universal Terrestrial Radio Access (E-UTRA); Multiplexing and channel coding (Release 12)," Dec. 2015, 94 pages.
3GPP TS 36.213 V12.8.0, "3$^{rd}$ Generation Partnership Project; Technical Specification Group Radio Access Network; Evolved Universal Terrestrial Radio Access (E-UTRA); Physical layer procedures (Release 12)," Dec. 2015, 241 pages.
International Search Report, dated Dec. 26, 2016, for corresponding International Application No. PCT/CN2016/078098, 2 pages.
Sesia et al., "LTE The UMTS Long Term Evolution—From Theory to Practice," Wiley, 2011, Chapter 9.3 and 16.3, 37 pages.
3GPP TS 36.211 V13.0.0, "3$^{rd}$ Generation Partnership Project; Technical Specification Group Radio Access Network; Evolved Universal Terrestrial Radio Access (E-UTRA); Physical channels and modulation (Release 13)," Dec. 2015, 141 pages.
CATT, "TDD Delay Analysis and Challenge in the TTI shortening," R1-160352, Agenda Item: 7.3.4.2, 3GPP TSG RAN WG1 Meeting #84, St. Julian's, Malta, Feb. 15-19, 2016, 4 pages.
Extended European Search Report, dated Oct. 22, 2019, for European Application No. 16895975.7-1219, 9 pages.
Japanese Office Action, dated Sep. 24, 2019, for Japanese Application No. 2018-550590, 12 pages. (with English translation).
Nokia Networks, Alcatel-Lucent, Alcatel-Lucent Shanghai Bell, "Considerations on shorter TTI for TDD duplex mode," R1-160780, Agenda item: 7.3.4.4, 3GPP TSG-RAN WG1 Meeting #84, St. Julian's, Malta, Feb. 15-19, 2016, 5 pages.
Panasonic, "Additional subframe type for TDD," R1-164913, Agenda Item: 6.2.10.4, 3GPP TSG RAN WG1 Meeting #85, Nanjing, China, May 23-27, 2016, 2 pages.
Samsung, "Discussion on other potential issues for TDD UL/DL reconfigurations," R1-133098, Agenda item: 7.2.3.4, 3GPP TSG RAN WG1 Meeting #74, Barcelona, Spain, Aug. 19-23, 2013, 3 pages.
ZTE, Qualcomm, NEC, "Clarification on additional SC-FDMA symbols in UpPTS for SRS," R1-161339, 3GPP TSG-RAN WG1 Meeting #84, St. Julian's, Malta, Feb. 15-18, 2016, 7 pages.
CATT, "UL collision handling for eMTC," R1-160352, Agenda Item: 7.1.5, 3GPP TSG RAN WG1 Meeting #84, St. Julian's, Malta, Feb. 15-19, 2016, 3 pages.

* cited by examiner

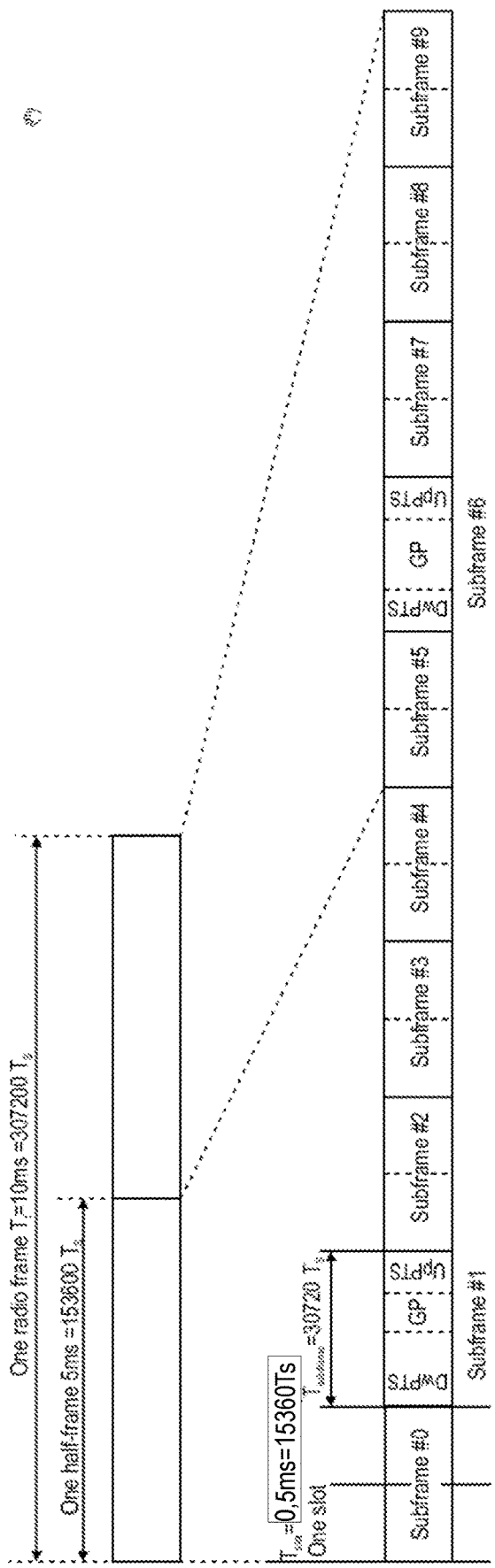

| Special subframe configuration | Normal cyclic prefix in downlink | | | | Extended cyclic prefix in downlink | | | |
|---|---|---|---|---|---|---|---|---|
| | Nd | Normal cyclic prefix in uplink | | Extended cyclic prefix in uplink | Nd | Normal cyclic prefix in uplink | | Extended cyclic prefix in uplink |
| | | | Nu | | | | Nu | |
| 0 | 3 | | 1 | | 3 | | 1 | |
| 1 | 9 | 1 | | 1 | 8 | 1 | | 1 |
| 2 | 10 | | | | 9 | | | |
| 3 | 11 | | | | 10 | | | |
| 4 | 12 | | | | 3 | | | |
| 5 | 3 | 2 | | 2 | 8 | 2 | | 2 |
| 6 | 10 | | | | 9 | | | |
| 7 | 11 | | | | 5 | | | |
| 8 | 12 | | | | - | - | | - |
| 9 | 6 | | | | - | - | | - |

| Special subframe configuration | Normal cyclic prefix in downlink | | | Extended cyclic prefix in downlink | | |
|---|---|---|---|---|---|---|
| | DwPTS [#samples (#symbols)] | UpPTS [#samples (#symbols)] Normal cyclic prefix in uplink | Extended cyclic prefix in uplink | DwPTS [#samples (#symbols)] | UpPTS [#samples (#symbols)] Normal cyclic prefix in uplink | Extended cyclic prefix in uplink |
| 0 | 6592 (3) | 2192 (1) | 2560 (1) | 7680 (3) | 2192 (1) | 2560 (1) |
| 1 | 19760 (9) | 2192 (1) | 2560 (1) | 20480 (8) | 2192 (1) | 2560 (1) |
| 2 | 21952 (10) | 2192 (1) | 2560 (1) | 23040 (9) | 2192 (1) | 2560 (1) |
| 3 | 24144 (11) | 2192 (1) | 2560 (1) | 25600 (10) | 2192 (1) | 2560 (1) |
| 4 | 26336 (12) | 2192 (1) | 2560 (1) | 7680 (3) | 4384 (2) | 5120 (2) |
| 5 | 6592 (3) | 4384 (2) | 5120 (2) | 20480 (8) | 4384 (2) | 5120 (2) |
| 6 | 19760 (9) | 4384 (2) | 5120 (2) | 23040 (9) | 4384 (2) | 5120 (2) |
| 7 | 21952 (10) | 4384 (2) | 5120 (2) | 12800 (5) | 4384 (2) | 5120 (2) |
| 8 | 24144 (11) | 4384 (2) | 5120 (2) | - | - | - |
| 9 | 13168 | 2192 (1) | 2560 (1) | 5120 (2) | 2192 (1) | 2560 (1) |
| 10 | 4400 (2) | 2192 (1) | 2560 (1) | 10240 (4) | 2192 (1) | 2560 (1) |
| 11 | 8784 (4) | 2192 (1) | 2560 (1) | 12800 (5) | 2192 (1) | 2560 (1) |
| 12 | 10976 (5) | 2192 (1) | 2560 (1) | 15360 (6) | 2192 (1) | 2560 (1) |
| 13 | 13168 (6) | 2192 (1) | 2560 (1) | 17920 (7) | 2192 (1) | 2560 (1) |
| 14 | 15360 (7) | 2192 (1) | 2560 (1) | - | - | - |
| 15 | 17568 (8) | 2192 (1) | 2560 (1) | - | - | - |
| 16 | 4400 (2) | 4384 (2) | 5120 (2) | 5120 (2) | 4384 (2) | 5120 (2) |
| 17 | 8784 (4) | 4384 (2) | 5120 (2) | 10240 (4) | 4384 (2) | 5120 (2) |
| 18 | 10976 (5) | 4384 (2) | 5120 (2) | 15360 (6) | 4384 (2) | 5120 (2) |
| 19 | 15360 (7) | 4384 (2) | 5120 (2) | 17920 (7) | 4384 (2) | 5120 (2) |
| 20 | 17568 (8) | 4384 (2) | 5120 (2) | - | - | - |

Fig. 8a

| Special subframe configuration | Normal cyclic prefix in downlink | | | Extended cyclic prefix in downlink | | |
|---|---|---|---|---|---|---|
| | DwPTS [#samples (#symbols)] | UpPTS [#samples] (#symbols) | | DwPTS [#samples (#symbols)] | UpPTS [#samples] (#symbols) | |
| | | Normal cyclic prefix in uplink | Extended cyclic prefix in uplink | | Normal cyclic prefix in uplink | Extended cyclic prefix in uplink |
| 21 | 4400 (2) | 6576 (3) | 7680 (3) | 5120 (2) | 6576 (3) | 7680 (3) |
| 22 | 6592 (3) | 6576 (3) | 7680 (3) | 7680 (3) | 6576 (3) | 7680 (3) |
| 23 | 8784 (4) | 6576 (3) | 7680 (3) | 10240 (4) | 6576 (3) | 7680 (3) |
| 24 | 10976 (5) | 6576 (3) | 7680 (3) | 12800 (5) | 6576 (3) | 7680 (3) |
| 25 | 13168 (6) | 6576 (3) | 7680 (3) | 15360 (6) | 6576 (3) | 7680 (3) |
| 26 | 15360 (7) | 6576 (3) | 7680 (3) | 17920 (7) | 6576 (3) | 7680 (3) |
| 27 | 17568 (8) | 6576 (3) | 7680 (3) | 20480 (8) | 6576 (3) | 7680 (3) |
| 28 | 19760 (9) | 6576 (3) | 7680 (3) | - | - | - |
| 29 | 21952 (10) | 6576 (3) | 7680 (3) | - | - | - |
| 30 | 4400 (2) | 8784 (4) | 10240 (4) | 5120 (2) | 8784 (4) | 10240 (4) |
| 31 | 6592 (3) | 8784 (4) | 10240 (4) | 7680 (3) | 8784 (4) | 10240 (4) |
| 32 | 8784 (4) | 8784 (4) | 10240 (4) | 10240 (4) | 8784 (4) | 10240 (4) |
| 33 | 10976 (5) | 8784 (4) | 10240 (4) | 12800 (5) | 8784 (4) | 10240 (4) |
| 34 | 13168 (6) | 8784 (4) | 10240 (4) | 15360 (6) | 8784 (4) | 10240 (4) |
| 35 | 15360 (7) | 8784 (4) | 10240 (4) | 17920 (7) | 8784 (4) | 10240 (4) |
| 36 | 17568 (8) | 8784 (4) | 10240 (4) | - | - | - |
| 37 | 19760 (9) | 8784 (4) | 10240 (4) | - | - | - |
| 38 | 4400 (2) | 10976 (5) | 12800 (5) | 5120 (2) | 10976 (5) | 12800 (5) |
| 39 | 6592 (3) | 10976 (5) | 12800 (5) | 7680 (3) | 10976 (5) | 12800 (5) |
| 40 | 8784 (4) | 10976 (5) | 12800 (5) | 10240 (4) | 10976 (5) | 12800 (5) |
| 41 | 10976 (5) | 10976 (5) | 12800 (5) | 12800 (5) | 10976 (5) | 12800 (5) |
| 42 | 13168 (6) | 10976 (5) | 12800 (5) | 15360 (6) | 10976 (5) | 12800 (5) |
| 43 | 15360 (7) | 10976 (5) | 12800 (5) | - | - | - |
| 44 | 17568 (8) | 10976 (5) | 12800 (5) | - | - | - |

| Special subframe configuration | Normal cyclic prefix in downlink | | | Extended cyclic prefix in downlink | | |
|---|---|---|---|---|---|---|
| | DwPTS [#samples (#symbols)] | UpPTS [#samples (#symbols)] Normal cyclic prefix in uplink | UpPTS [#samples (#symbols)] Extended cyclic prefix in uplink | DwPTS [#samples (#symbols)] | UpPTS [#samples (#symbols)] Normal cyclic prefix in uplink | UpPTS [#samples (#symbols)] Extended cyclic prefix in uplink |
| 45 | 4400 (2) | 13168 (6) | 15360 (6) | 5120 (2) | 13168 (6) | 15360 (6) |
| 46 | 6592 (3) | 13168 (6) | 15360 (6) | 7680 (3) | 13168 (6) | 15360 (6) |
| 47 | 8784 (4) | 13168 (6) | 15360 (6) | 10240 (4) | 13168 (6) | 15360 (6) |
| 48 | 10976 (5) | 13168 (6) | 15360 (6) | 12800 (5) | 13168 (6) | 15360 (6) |
| 49 | 13168 (6) | 13168 (6) | 15360 (6) | - | - | - |
| 50 | 15360 (7) | 13168 (6) | 15360 (6) | - | - | - |
| 51 | 4400 (2) | 15360 (7) | 17920 (7) | 5120 (2) | 15360 (7) | 17920 (7) |
| 52 | 6592 (3) | 15360 (7) | 17920 (7) | 7680 (3) | 15360 (7) | 17920 (7) |
| 53 | 8784 (4) | 15360 (7) | 17920 (7) | 10240 (4) | 15360 (7) | 17920 (7) |
| 54 | 10976 (5) | 15360 (7) | 17920 (7) | - | - | - |
| 55 | 13168 (6) | 15360 (7) | 17920 (7) | - | - | - |
| 56 | 4400 (2) | 17568 (8) | 20480 (8) | 5120 (2) | 17568 (8) | 20480 (8) |
| 57 | 6592 (3) | 17568 (8) | 20480 (8) | 7680 (3) | 17568 (8) | 20480 (8) |
| 58 | 8784 (4) | 17568 (8) | 20480 (8) | - | - | - |
| 59 | 10976 (5) | 17568 (8) | 20480 (8) | - | - | - |
| 60 | 4400 (2) | 19760 (9) | 23040 (9) | 5120 (2) | 9 | 9 |
| 61 | 6592 (3) | 19760 (9) | 23040 (9) | - | - | - |
| 62 | 8784 (4) | 19760 (9) | 23040 (9) | - | - | - |
| 63 | 4400 (2) | 21952 (10) | 25600 (10) | - | - | - |
| 64 | 6592 (3) | 21952 (10) | 25600 (10) | - | - | - |
| 65 | 4400 (2) | 24144 (11) | - | - | - | - |

Fig. 12a

| UL-DL Config | Switch | \multicolumn{10}{c}{Subframe Number} |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 1a | 5 ms | D | S | U | U | A | D | S | U | U | A |
| 1b | 5 ms | D | S | U | U | D | D | S | U | D | A |
| 1c | 5 ms | D | S | U | U | A | D | S | U | D | A |
| 2 | 5 ms | D | S | U | D | D | D | S | U | D | D |
| 2a | 5 ms | D | S | U | A | A | D | S | U | A | A |
| 2b | 5 ms | D | S | U | A | A | D | S | U | D | A |
| 2c | 5 ms | D | S | U | A | A | D | S | U | A | D |
| 2d | 5 ms | D | S | U | A | A | D | S | U | D | D |
| 2e | 5 ms | D | S | U | A | D | D | S | U | A | D |
| 2f | 5 ms | D | S | U | D | A | D | S | U | A | D |
| 2g | 5 ms | D | S | U | D | D | D | S | U | A | A |
| 2h | 5 ms | D | S | U | D | A | D | S | U | A | D |
| 2i | 5 ms | D | S | U | D | A | D | S | U | D | A |
| 2j | 5 ms | D | S | U | D | A | D | S | U | A | D |
| 2k | 5 ms | D | S | U | D | D | D | S | U | A | D |
| 2l | 5 ms | D | S | U | D | A | D | S | U | D | D |
| 2m | 5 ms | D | S | U | D | D | D | S | U | D | A |
| 2n | 5 ms | D | S | U | D | D | D | S | U | A | D |
| 2o | 5 ms | D | S | U | D | D | D | S | U | D | A |

Fig. 12b

| UL-DL Config | Switch | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 3 | 10 ms | D | S | U | U | U | D | D | D | D | D |
| 3a | 10 ms | D | S | U | U | U | D | A | D | A | A |
| 3b | 10 ms | D | S | U | U | U | D | A | A | A | D |
| 3c | 10 ms | D | S | U | U | U | D | A | A | D | A |
| 3d | 10 ms | D | S | U | U | U | D | A | D | D | D |
| 3e | 10 ms | D | S | U | U | U | D | A | A | A | A |
| 3f | 10 ms | D | S | U | U | U | D | A | D | A | D |
| 3g | 10 ms | D | S | U | U | U | D | D | D | D | A |
| 3h | 10 ms | D | S | U | U | U | D | D | D | A | D |
| 3i | 10 ms | D | S | U | U | U | D | D | A | A | A |
| 3j | 10 ms | D | S | U | U | U | D | D | A | D | D |
| 3k | 10 ms | D | S | U | U | U | D | D | A | A | D |
| 3l | 10 ms | D | S | U | U | U | D | D | A | D | A |
| 3m | 10 ms | D | S | U | U | U | D | D | D | A | D |
| 3n | 10 ms | D | S | U | U | U | D | D | D | A | D |
| 3o | 10 ms | D | S | U | U | U | D | D | D | D | A |

Fig. 12c

| UL-DL Config | Switch | 0 | 1 | 2 | 3 | 4 | 5 | 6 | 7 | 8 | 9 |
|---|---|---|---|---|---|---|---|---|---|---|---|
| 4 | 10 ms | D | S | U | U | U | D | D | D | D | D |
| 4a | 10 ms | D | S | U | U | A | D | A | A | A | A |
| 4b | 10 ms | D | S | U | U | A | D | A | A | A | D |
| 4c | 10 ms | D | S | U | U | A | D | A | A | D | A |
| 4d | 10 ms | D | S | U | U | A | D | A | A | D | D |
| 4e | 10 ms | D | S | U | U | A | D | A | D | A | A |
| 4f | 10 ms | D | S | U | U | A | D | A | D | A | D |
| 4g | 10 ms | D | S | U | U | A | D | A | D | D | A |
| 4h | 10 ms | D | S | U | U | A | D | A | D | D | D |
| 4i | 10 ms | D | S | U | U | A | D | D | A | A | A |
| 4j | 10 ms | D | S | U | U | A | D | D | A | A | D |
| 4k | 10 ms | D | S | U | U | A | D | D | A | D | A |
| 4l | 10 ms | D | S | U | U | A | D | D | A | D | D |
| 4m | 10 ms | D | S | U | U | A | D | D | D | A | A |
| 4n | 10 ms | D | S | U | U | A | D | D | D | A | D |
| 4o | 10 ms | D | S | U | U | A | D | D | D | D | A |
| 4p | 10 ms | D | S | U | U | A | D | D | D | D | D |

Subframe Number

Fig. 12d

| UL-DL Config | Switch | \multicolumn{10}{c}{Subframe Number} |
| | | 0 | 1 | 2 | 3 | 4 | 5 | 6 | 7 | 8 | 9 |
|---|---|---|---|---|---|---|---|---|---|---|---|
| 4q | 10 ms | D | S | U | U | D | D | A | A | A | A |
| 4r | 10 ms | D | S | U | U | D | D | A | A | A | D |
| 4s | 10 ms | D | S | U | U | D | D | A | A | D | A |
| 4t | 10 ms | D | S | U | U | D | D | A | D | D | D |
| 4u | 10 ms | D | S | U | U | D | D | A | D | A | A |
| 4v | 10 ms | D | S | U | U | D | D | A | D | A | D |
| 4w | 10 ms | D | S | U | U | D | D | A | A | D | A |
| 4x | 10 ms | D | S | U | U | D | D | D | A | A | A |
| 4y | 10 ms | D | S | U | U | D | D | D | A | A | D |
| 4z | 10 ms | D | S | U | U | D | D | D | A | D | A |
| 4aa | 10 ms | D | S | U | U | D | D | D | D | D | A |
| 4ab | 10 ms | D | S | U | U | D | D | D | D | D | A |
| 4ac | 10 ms | D | S | U | U | D | D | D | D | A | A |
| 4ad | 10 ms | D | S | U | U | D | D | D | D | A | D |
| 4ae | 10 ms | D | S | U | U | D | D | D | D | D | A |

Fig. 12e

| UL-DL Config | Switch | 0 | 1 | 2 | 3 | 4 | 5 | 6 | 7 | 8 | 9 |
|---|---|---|---|---|---|---|---|---|---|---|---|
| 5 | 10 ms | D | S | U | D | D | D | D | D | D | D |
| 5a | 10 ms | D | S | U | A | A | D | A | A | A | A |
| 5b | 10 ms | D | S | U | A | A | D | A | A | A | D |
| 5c | 10 ms | D | S | U | A | A | D | A | A | D | A |
| 5d | 10 ms | D | S | U | A | A | D | A | D | D | D |
| 5e | 10 ms | D | S | U | A | A | D | A | D | A | A |
| 5f | 10 ms | D | S | U | A | A | D | A | D | A | D |
| 5g | 10 ms | D | S | U | A | A | D | D | D | D | A |
| 5h | 10 ms | D | S | U | A | A | D | D | A | A | A |
| 5i | 10 ms | D | S | U | A | A | D | D | A | A | D |
| 5j | 10 ms | D | S | U | A | A | D | D | A | D | A |
| 5k | 10 ms | D | S | U | A | A | D | D | A | D | D |
| 5l | 10 ms | D | S | U | A | A | D | D | D | A | A |
| 5m | 10 ms | D | S | U | A | A | D | D | D | A | D |
| 5n | 10 ms | D | S | U | A | A | D | D | D | A | A |
| 5o | 10 ms | D | S | U | A | A | D | D | D | D | D |
| 5p | 10 ms | D | S | U | A | A | D | D | D | D | D |

Subframe Number

Fig. 12f

| UL-DL Config | Switch | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 5q | 10 ms | D | S | U | A | D | D | A | A | A | A |
| 5r | 10 ms | D | S | U | A | D | D | A | A | A | D |
| 5s | 10 ms | D | S | U | A | D | D | A | A | D | A |
| 5t | 10 ms | D | S | U | A | D | D | A | D | D | D |
| 5u | 10 ms | D | S | U | A | D | D | A | D | A | A |
| 5v | 10 ms | D | S | U | A | D | D | A | D | A | D |
| 5w | 10 ms | D | S | U | A | D | D | D | D | D | A |
| 5x | 10 ms | D | S | U | A | D | D | D | A | A | D |
| 5y | 10 ms | D | S | U | A | D | D | D | A | A | A |
| 5z | 10 ms | D | S | U | A | D | D | D | A | D | D |
| 5aa | 10 ms | D | S | U | A | D | D | D | D | D | D |
| 5ab | 10 ms | D | S | U | A | D | D | D | D | A | A |
| 5ac | 10 ms | D | S | U | A | D | D | D | D | A | D |
| 5ad | 10 ms | D | S | U | A | D | D | D | D | D | A |
| 5ae | 10 ms | D | S | U | A | D | D | D | D | D | A |
| 5af | 10 ms | D | S | U | A | D | D | D | D | D | D |

Fig. 12g

| UL-DL Config | Switch | 0 | 1 | 2 | 3 | 4 | 5 | 6 | 7 | 8 | 9 |
|---|---|---|---|---|---|---|---|---|---|---|---|
| 5ag | 10 ms | D | S | U | D | A | D | A | A | A | A |
| 5ah | 10 ms | D | S | U | D | A | D | A | A | A | D |
| 5ai | 10 ms | D | S | U | D | A | D | A | A | D | A |
| 5aj | 10 ms | D | S | U | D | A | D | A | D | D | D |
| 5ak | 10 ms | D | S | U | D | A | D | A | D | A | A |
| 5al | 10 ms | D | S | U | D | A | D | A | D | A | D |
| 5am | 10 ms | D | S | U | D | A | D | A | D | D | A |
| 5an | 10 ms | D | S | U | D | A | D | D | D | D | D |
| 5ao | 10 ms | D | S | U | D | A | D | D | A | A | A |
| 5ap | 10 ms | D | S | U | D | A | D | D | A | A | D |
| 5aq | 10 ms | D | S | U | D | A | D | D | A | D | A |
| 5ar | 10 ms | D | S | U | D | A | D | D | D | A | A |
| 5as | 10 ms | D | S | U | D | A | D | D | D | A | D |
| 5at | 10 ms | D | S | U | D | A | D | D | D | D | A |
| 5au | 10 ms | D | S | U | D | A | D | D | D | D | A |
| 5av | 10 ms | D | S | U | D | A | D | D | D | D | D |

Fig. 12h

| UL-DL Config | Switch | 0 | 1 | 2 | 3 | 4 | 5 | 6 | 7 | 8 | 9 |
|---|---|---|---|---|---|---|---|---|---|---|---|
| 5aw | 10 ms | D | S | U | D | D | D | A | A | A | A |
| 5ax | 10 ms | D | S | U | D | D | D | A | A | A | D |
| 5ay | 10 ms | D | S | U | D | D | D | A | A | D | A |
| 5az | 10 ms | D | S | U | D | D | D | A | A | D | D |
| 5ba | 10 ms | D | S | U | D | D | D | A | D | A | A |
| 5bb | 10 ms | D | S | U | D | D | D | A | D | A | D |
| 5bc | 10 ms | D | S | U | D | D | D | A | D | D | A |
| 5bd | 10 ms | D | S | U | D | D | D | A | D | D | D |
| 5be | 10 ms | D | S | U | D | D | D | D | A | A | A |
| 5bf | 10 ms | D | S | U | D | D | D | D | A | A | D |
| 5bg | 10 ms | D | S | U | D | D | D | D | A | D | A |
| 5bh | 10 ms | D | S | U | D | D | D | D | A | D | D |
| 5bi | 10 ms | D | S | U | D | D | D | D | D | A | A |
| 5bj | 10 ms | D | S | U | D | D | D | D | D | A | D |
| 5bk | 10 ms | D | S | U | D | D | D | D | D | D | A |
| 6 | 5 ms | D | S | U | U | U | D | S | U | U | D |
| 6a | 5 ms | D | S | U | U | U | D | S | U | U | A |

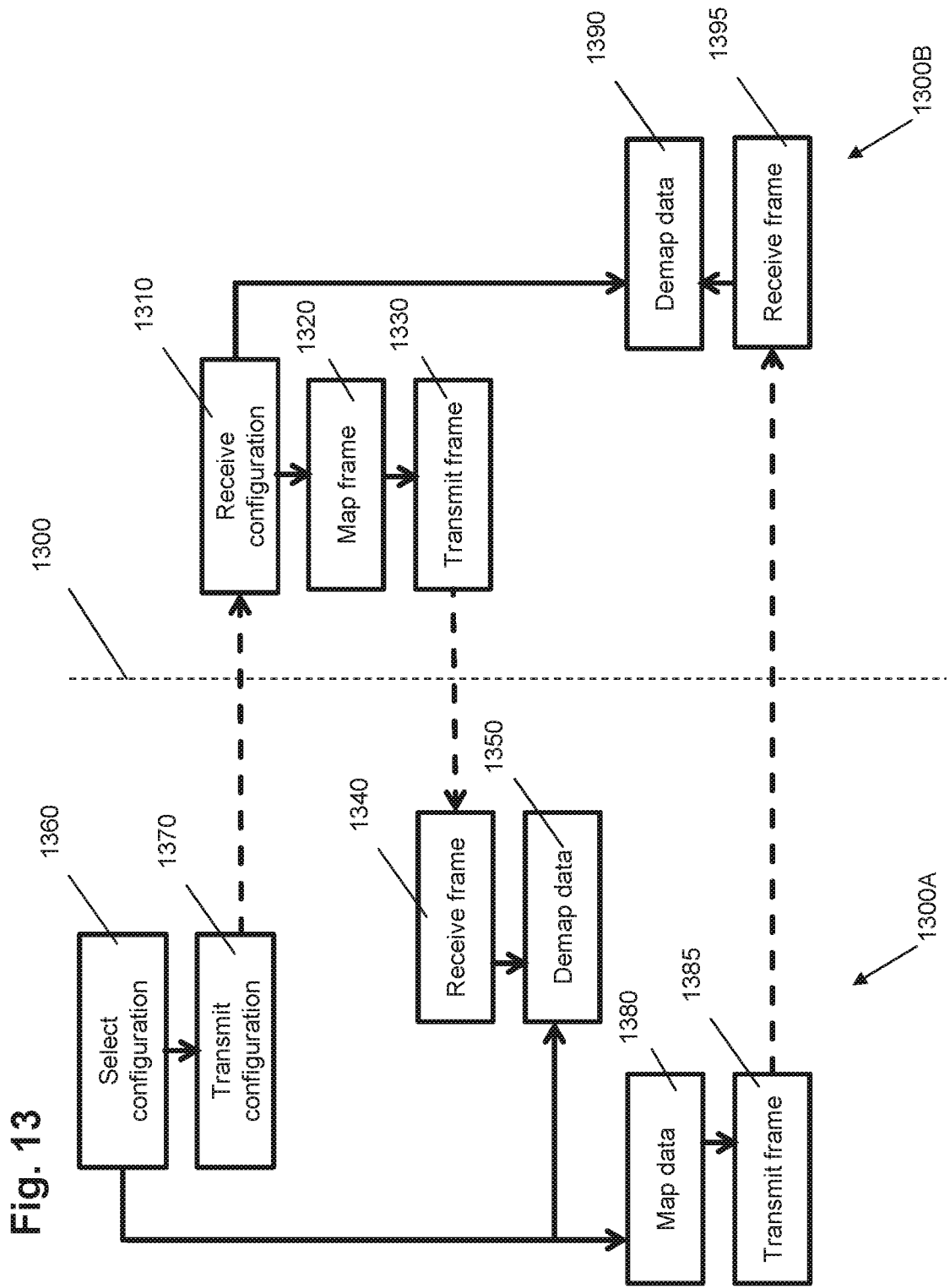

SPECIAL SUBFRAME CONFIGURATION FOR LATENCY REDUCTION

BACKGROUND

Technical Field

The present disclosure relates to configuring subframes including both uplink and downlink portions in a wireless communication system and to transmitting and receiving data in such subframes.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since the provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relationship between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at the time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipment. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the Sha interface towards the home HSS for roaming user equipments.

Component Carrier Structure in LTE (Release 8)

The downlink component carrier of a 3GPP LTE (Release 8 and further) is subdivided in the time-frequency domain in so-called subframes. In 3GPP LTE (Release 8 and further) each subframe is divided into two downlink slots, one of which is shown in FIG. 3. The first downlink slot comprises the control channel region (PDCCH region) within the first OFDM symbols. Each subframe consists of a given number of OFDM symbols in the time domain (12 or 14 OFDM symbols in 3GPP LTE, Release 8 and further), wherein each OFDM symbol spans over the entire bandwidth of the component carrier. The OFDM symbols thus each consists of a number of modulation symbols transmitted on respective $N_{RB}^{DL} \times N_{sc}^{RB}$ subcarriers. Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as $N_{symb}^{DL}$ consecutive OFDM symbols in the time domain (e.g., 7 OFDM symbols) and $N_{sc}^{RB}$ consecutive subcarriers in the frequency domain as exemplified in FIG. 3 (e.g., 12 subcarriers for a component carrier). In 3GPP LTE (Release 8), a physical resource block thus consists of $N_{symb}^{DL} \times N_{sc}^{RB}$ resource elements, corresponding to one slot in the time domain and 180 kHz in the frequency domain (for further details on the downlink resource grid, see for example 3GPP TS 36.211, v8.9.0, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For the sake of terminology, in the following the time-frequency resources equivalent to the same $N_{sc}^{RB}$ consecutive subcarriers spanning a full subframe is called a "resource block pair", or equivalent "RB pair" or "PRB pair".

The term "component carrier" refers to a combination of several resource blocks in the frequency domain. In future releases of the LTE, the term "component carrier" is no longer used, instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Time Division Duplex—TDD

LTE can operate in Frequency-Division-Duplex (FDD) and Time-Division-Duplex (TDD) modes in a harmonized framework, designed also to support the evolution of TD-SCDMA (Time-Division Synchronous Code Division Multiple Access). TDD separates the uplink and downlink transmissions in the time domain, while the frequency may stay the same.

The term "duplex" refers to bidirectional communication between two devices, distinct from unidirectional communication. In the bidirectional case, transmissions over the link in each direction may take place at the same time ("full duplex") or at mutually exclusive times ("half duplex").

For TDD in the unpaired radio spectrum, the basic structure of RBs and REs is depicted in FIG. 4, but only a subset of the subframes of a radio frame are available for downlink transmissions; the remaining subframes are used for uplink transmissions or for special subframes. Special subframes are important to allow uplink transmission timings to be advanced, so as to make sure that transmitted signals from the UEs (i.e., uplink) arrive roughly at the same time at the eNodeB. Since the signal propagation delay is related to the distance between transmitter and receiver (neglecting reflection and other similar effects), this means that a signal transmitted by a UE near the eNodeB travels for a short time than the signals transmitted by a UE far from the eNodeB. In order to arrive at the same time, the far UE has to transmit its signal earlier than the near UE, which is solved by the so-called "timing advance" procedure in 3GPP systems. In TDD this has the additional circumstance of the transmission and reception occurring on the same carrier frequency, i.e., downlink and uplink need to be duplexed in time domain. While a UE far from the eNodeB needs to start uplink transmission earlier than the near UE, conversely, a downlink signal is received by a near UE earlier than by the far UE. In order to be able to switch the circuitry from DL reception to UL transmission, guard time is defined in the special subframe. In order to manage the timing advance problem, the guard time for a far UE needs to be longer than for a near UE.

FIG. 4 shows the frame structure type 2, particularly for a 5 ms switch-point periodicity, i.e., for TDD configurations 0, 1, 2 and 6. In particular, FIG. 4 illustrates a radio frame, being 10 ms in length, and the corresponding two half-frames of 5 ms each. The radio frame consists of 10 subframes each with 1 ms, where each of the subframes is assigned the type of uplink (U), downlink (D) or special (S), as defined by one of the Uplink-downlink configurations according to the table of FIG. 5.

This TDD structure is known as "Frame Structure Type 2" in 3GPP LTE Release 8 and later, of which seven different uplink-downlink configurations are defined, which allow a variety of downlink-uplink ratios and switching periodicities. FIG. 5 illustrates the Table with the 7 different TDD uplink-downlink configurations, indexed from 0-6, where "D" shall indicate a downlink subframe, "U" an uplink subframe and "S" a special subframe. These configurations differ from each other by the number and location of the uplink (U) and downlink (D) subframes as well as the special subframes for downlink-uplink switching in the TDD operation (S). As can be seen therefrom, the seven available TDD uplink-downlink configurations can provide between 40% and 90% of downlink subframes (if, for simplicity, counting a special subframe as a downlink subframe, since part of such a subframe is available for downlink transmission).

As can be appreciated from FIG. 5, subframe #1("#" meaning "number") is always a Special subframe, and subframe #6 is sometimes a special subframe, namely for TDD configurations 0, 1, 2 and 6. On the other hand, for TDD configurations 3, 4 and 5, subframe #6 is destined for downlink. The remaining subframes are uplink or downlink subframes.

Special subframes include three fields: DwPTS (Downlink Pilot Time Slot), the GP (Guard Period) and UpPTS (Uplink Pilot Time Slot). They are used to separate uplink and downlink subframes. In the special subframes, uplink and downlink signals may be transmitted in the respective subframe fields UpPTS and DwPTS, respectively. They are separated by a guard period also called the downlink-uplink switching point. Uplink and downlink capacity in this irregular subframe S is reduced in comparison to a normal subframe implying that less bits of forward error correction redundancy can be employed for a given transport block size or the transport block size itself is to be reduced.

FIG. 6 shows table on the special subframe configurations and, in particular, lists the lengths of DwPTS (Downlink Pilot Time Slot) and of UpPTS (Uplink Pilot Time Slot) in number if downlink symbols Nd and number of uplink symbols Nu, as defined for 3GPP LTE Release 11. Even though 3GPP defines the DwPTS and UpPTS lengths as multiples of the sampling frequency (Ts), they nevertheless represent a number of OFDM or SC-FDMA symbols that are contained in DwPTS and UpPTS, respectively. For example, in the special subframe configuration #1,the DwPTS length assuming a normal cyclic prefix is defined as 6592 Ts. For normal cyclic prefix, the length of the first and seventh OFDM symbols are each 2208 Ts, while other symbols are 2192 Ts long. Therefore a DwPTS length of 6592 Ts is equivalent to Nd=3 OFDM symbols: (2208+2192+2192) Ts=6592 Ts. The GP (Guard Period) can be derived by subtracting the relevant DwPTS and UpPTS lengths from the length (in number of symbols, or in multiples of Ts) of the special subframe (for instance 14). The special subframe configuration is independent from the Uplink-Downlink configuration shown in FIG. 5, so that all combinations of those two configurations are possible.

The special subframe configuration in table of FIG. 6 can take values 0-9, each of which is associated with a particular configuration of number of uplink and downlink symbols. The number of uplink and downlink symbols further depends on the length of an uplink and downlink cyclical prefix applied. As can be seen from the Table, the length of the uplink portion (UpPTS) of the special frame is rather low and can take only 1 or two symbols. Thus, the UpPTS is merely used for transmitting uplink signals such as reference signals or random access requests in the form of an access preamble.

The TDD configuration applied in the system has an impact on many operations performed at the mobile station and base station, such as radio resource management (RRM) measurements, channel state information (CSI) measurements, channel estimations, PDCCH detection and HARQ timings. In particular, the UE reads the system information to learn about the TDD configuration in its current cell, i.e., which subframe to monitor for measurement, for CSI measuring and reporting, for time domain filtering to get channel estimation, for PDCCH detection, or for UL/DL ACK/NACK feedback.

Logical and Transport Channels

The MAC layer provides a data transfer service for the RLC layer through logical channels. Logical channels are either Control Logical Channels which carry control data such as RRC signaling, or Traffic Logical Channels which carry user plane data. Broadcast Control Channel (BCCH), Paging Control Channel (PCCH), Common Control Channel (CCCH), Multicast Control Channel (MCCH) and Dedicated Control Channel (DCCH) are Control Logical Channels. Dedicated Traffic Channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows; Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. User allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only to be transmitted once per TTI. In LTE Release 8, the TTI is 1 ms, equivalent to one subframe.

The TTI is a parameter in UMTS and LTE (and other digital telecommunication networks) related to encapsulation of data from higher layers for transmission on the radio link layer. It TTI is also related to the size of the data blocks passed from the higher network layers to the radio link layer. In particular, TTI determines the timing and granularity of the mapping of data onto the physical layer. One TTI is the time interval in which given data is mapped to the physical layer.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe. In 3GPP LTE, assignments for uplink data transmissions, also referred to as uplink scheduling grants or uplink resource assignments, are also transmitted on the PDCCH.

Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (Resource Blocks, RBs) on which a user is allocated. Note, that the number of RBs on which a user is allocated can be dynamic;

Carrier indicator, which is used if a control channel transmitted on a first carrier assigns resources that concern a second carrier, i.e., resources on a second carrier or resources related to a second carrier;

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication of whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive depending on the DCI format that is used, not all mentioned information items need to be present in each PDCCH transmission.

Downlink control information occurs in several formats that differ in overall size and also in the information contained in its fields. The different DCI formats that are currently defined for LTE are as follows and described in detail in 3GPP TS 36.212, v12.7.0, "Multiplexing and channel coding", Section 5.3.3.1 (available at http://www.3gpp.org and incorporated herein by reference). For further information regarding the DCI formats and the particular information that is transmitted in the DCI, please refer to the technical standard or to the book "LTE—The UMTS Long Term Evolution—From Theory to Practice", Edited by Stefanie Sesia, Issam Toufik, Matthew Baker, Wiley, 2011, Chapter 9.3, incorporated herein by reference.

In order that the UE can identify whether it has received a PDCCH transmission correctly, error detection is provided by means of a 16-bit CRC appended to each PDCCH (i.e., DCI). Furthermore, it is necessary that the UE can identify which PDCCH(s) are intended for it. This could in theory be achieved by adding an identifier to the PDCCH payload; however, it is more efficient to scramble the CRC with the "UE identity", which saves the additional overhead. The CRC parity bits may be calculated by using the entire payload. The parity bits are computed and attached. In the case where the UE transmit antenna selection is not configured or applicable, after attachment, the CRC parity bits are scrambled with the corresponding RNTI.

The scrambling may further depend on the UE transmit antenna selection. In the case where the UE transmit antenna selection is configured and applicable, after attachment, the CRC parity bits are scrambled with an antenna selection mask and the corresponding RNTI. In both cases the RNTI is involved in the scrambling operation.

Correspondingly, the UE descrambles the CRC by applying the "UE identity" and, if no CRC error is detected, the UE determines that the PDCCH carries its control information intended for itself. The terminology of "masking" and "de-masking" is used as well, for the above-described process of scrambling a CRC with an identity.

The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known a priori to all UEs.

In general, uplink control data in the LTE is transmitted either together with user data on the Physical Uplink Shared Channel (PUSCH) or on the Physical Uplink Control Channel (PUCCH) within so called Uplink Control Information (UCI). The UCI comprises at least one of:
  Scheduling requests
  HARQ ACK/NACK in response to downlink data packets on the PDSCH
  Channel State Information (CSI) including Channel Quality Indicator (CQI) and/or Rank Indicator (RI) related to MIMO transmission and/or Precoding Matrix Indicator (PMI).

For further information regarding the UCI formats and the particular information that is transmitted in the UCI, please refer to the technical standard or to LTE—The UMTS Long Term Evolution—From Theory to Practice, Edited by Stefanie Sesia, Issam Toufik, Matthew Baker, Wiley, 2011, Chapter 16.3, incorporated herein by reference.

Physical Downlink Control Channel (PDCCH) and Physical Downlink Shared Channel (PDSCH)

The physical downlink control channel (PDCCH) carries for example scheduling grants for allocating resources for downlink or uplink data transmission. Multiple PDCCHs can be transmitted in a subframe.

The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{sc}^{RB}$ subcarriers in the frequency domain is also referred to as a PDCCH region or control channel region. The remaining $N_{symb}^{PDSCH} = 2 \cdot N_{symb}^{DL} - N_{symb}^{PDCCH}$ OFDM symbols in the time domain on the $N_{RB}^{DL} \times N_{sc}^{RB}$ subcarriers in the frequency domain is referred to as the PDSCH region or shared channel region (see below).

For a downlink grant (i.e., resource assignment) on the physical downlink shared channel (PDSCH), the PDCCH assigns a PDSCH resource for (user) data within the same subframe. The PDCCH control channel region within a subframe consists of a set of CCE where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate.

On a transport channel level, the information transmitted via the PDCCH is also referred to as L1/L2 control signaling (for details on L1/L2 control signaling see above).

There is a particular predefined timing relation between uplink resource assignments received in a subframe and the corresponding uplink transmission in PUSCH. Details are given in TS 36.213 v12.8.0 "3rd Generation Partnership Project; Technical Specification Group Radio Access Network; Evolved Universal Terrestrial Radio Access (E-UTRA); Physical layer procedures (Release 11)" Chapter 8.0 "UE procedure for transmitting the physical uplink shared channel" incorporated herewith by reference. In particular, Table 8-2 of TS 36.213 defines the parameter k for the TDD configurations 0-6, where k indicates the positive offset of the target of an uplink resource allocation received in a subframe; for TDD configuration 0 there is an additional definition of the timing for uplink subframes 3 and 8, omitted herewith for simplicity. For instance, the parameter k is 6 for subframe 1 of TDD configuration 1, meaning that an uplink resource allocation received in subframe 1 of TDD configuration 1 is intended for subframe 1+6=7 of TDD configuration 1, which indeed is an uplink subframe, etc.

Hybrid ARQ Schemes

A common technique for error detection and correction in packet transmission systems over unreliable channels is called hybrid Automatic Repeat request (HARQ). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet. Generally (and throughout this document) the transmission of additional information is called "retransmission (of a packet)", although this retransmission does not necessarily mean a transmission of the same encoded information but could also mean the transmission of any information belonging to the packet (e.g., additional redundancy information).

Depending on the information (generally code-bits/symbols) of which the transmission is composed, and depending on how the receiver processes the information, the following Hybrid ARQ schemes are defined:

In Type I HARQ schemes, the information of the encoded packet is discarded and a retransmission is requested, if the receiver fails to decode a packet correctly. This implies that all transmissions are decoded separately. Generally, retransmissions contain identical information (code-bits/symbols) to the initial transmission.

In Type II HARQ schemes, a retransmission is requested, if the receiver fails to decode a packet correctly, where the receiver stores the information of the (erroneously received) encoded packet as soft information (soft-bits/symbols). This implies that a soft-buffer is required at the receiver. Retransmissions can be composed out of identical, partly identical or non-identical information (code-bits/symbols) according to the same packet as earlier transmissions. When receiving a retransmission the receiver combines the stored information from the soft-buffer and the currently received information and tries to decode the packet based on the combined information. (The receiver can also try to decode the transmission individually, however generally performance increases when combining transmissions.) The combining of transmissions refers to so-called soft-combining, where multiple received code-bits/symbols are likelihood-combined and solely received code-bits/symbols are code combined. Common methods for soft-combining are Maximum Ratio Combining (MRC) of received modulation symbols and log-likelihood-ratio (LLR) combining (LLR combing only works for code-bits).

Type II schemes are more sophisticated than Type I schemes, since the probability for correct reception of a packet increases with every received retransmission. This increase comes at the cost of a required hybrid ARQ soft-buffer at the receiver. This scheme can be used to perform dynamic link adaptation by controlling the amount of information to be retransmitted. E.g., if the receiver detects that decoding has been "almost" successful, it can request only a small piece of information for the next retransmission (smaller number of code-bits/symbols than in previous transmission) to be transmitted. In this case it might happen that it is even theoretically not possible to decode the packet correctly by only considering this retransmission by itself (non-self-decodable retransmissions).

Type III HARQ schemes may be considered a subset of Type II schemes: In addition to the requirements of a Type II scheme each transmission in a Type III scheme must be self-decodable.

Synchronous HARQ means that the re-transmissions of HARQ blocks occur at pre-defined periodic intervals. Hence, no explicit signaling is required to indicate to the receiver the retransmission schedule.

Asynchronous HARQ offers the flexibility of scheduling re-transmissions based on air interface conditions. In this case some identification of the HARQ process needs to be signaled in order to allow for a correct combining and protocol operation. In 3GPP LTE systems, HARQ operations with eight processes are used. The HARQ protocol operation for downlink data transmission will be similar or even identical to HSDPA.

In uplink HARQ protocol operation there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions). In case of a synchronous non-adaptive retransmission the retransmission will use the same parameters as the previous uplink transmission, i.e., the retransmission will be signaled on the same physical channel resources, respectively uses the same modulation scheme/transport format.

Since synchronous adaptive retransmissions are explicitly scheduled via PDCCH, the eNodeB has the possibility to change certain parameters for the retransmission. A retransmission could be for example scheduled on a different frequency resource in order to avoid fragmentation in the uplink, or eNodeB could change the modulation scheme or alternatively indicate to the user equipment what redundancy version to use for the retransmission. It should be noted that the HARQ feedback (ACK/NACK) and PDCCH signaling occurs at the same timing. Therefore the user equipment only needs to check once whether a synchronous non-adaptive retransmission is triggered (i.e., only a NACK is received) or whether eNode B requests a synchronous adaptive retransmission (i.e., PDCCH is signaled).

HARQ and Control Signaling for TDD Operation

As explained above, transmission of downlink or uplink data with HARQ requires that an ACKnowledgement ACK or Negative ACK be sent in the opposite direction to inform the transmitting side of the success or failure of the packet reception.

In case of FDD operation, acknowledgement indicators related to data transmission in a subframe n are transmitted in the opposite direction during subframe n+4, such that a one-to-one synchronous mapping exists between the instant at which the transport is transmitted and its corresponding acknowledgment. However, in the case of TDD operation, subframes are designated on a cell-specific basis as uplink or downlink or special (see next chapter), thereby constraining the times at which resource grants, data transmissions, acknowledgments and retransmissions can be sent in their respective directions. The LTE design for TDD therefore supports grouped ACK/NACK transmissions to carry multiple acknowledgements within one subframe.

For uplink HARQ, the sending (in one downlink subframe) of multiple acknowledgements on the Physical Hybrid ARQ Indicator CHannel (PHICH) is not problematic since, when viewed from the eNodeB, this is not significantly different from the case in which single acknowledgements are sent simultaneously to multiple UEs. However, for downlink HARQ, if the asymmetry is downlink-biased, the uplink control signaling (PUCCH) formats of FDD are insufficient to carry the additional ACK/NACK information. Each of the TDD subframe configurations in LTE (see below, and FIG. 5) has its own such mapping predefined between downlink and uplink subframes for HARQ purposes, with the mapping being designed to achieve a balance between minimization of acknowledgment delay and an even distribution of ACK/NACKs across the available uplink subframes. Further details are provided in TS 36.213 v12.8.0 "3rd Generation Partnership Project; Technical Specification Group Radio Access Network; Evolved Universal Terrestrial Radio Access (E-UTRA); Physical layer procedures (Release 11)" Chapter 7.3 incorporated herewith by reference.

TS 36.213 v12.8.0 "3rd Generation Partnership Project; Technical Specification Group Radio Access Network; Evolved Universal Terrestrial Radio Access (E-UTRA); Physical layer procedures (Release 11)" Chapter 10.1.3, incorporated herein by reference explains the TDD HARQ-ACK feedback procedure. Table 10.1.3-1 of TS 36.213 gives the downlink association set index for the ACK/NACK/DTX responses for the subframes of a radio frame, wherein the number in the boxes for the TDD configurations indicates the negative offset of the subframe which HARQ feedback is transported in said subframe. For instance, subframe 9 for TDD configuration 0 transports the HARQ feedback of subframe 9−4=5; subframe 5 of TDD configuration 0 being indeed a downlink subframe (see FIG. 5).

In a HARQ operation, the eNB can transmit a different coded version from the original TB in retransmissions so that the UE can employ incremental redundancy (IR) combining to get additional coding gain over the combining gain. However, in realistic systems, it is possible that the eNB transmits a TB to one specific UE on one resource segment, but the UE cannot detect the data transmission due to DL control information lost. In this case, IR combining will lead to very poor performance for decoding the retransmissions because the systematic data has not been available at the UE. In order to mitigate this problem the UE should feedback a third state, namely discontinuous transmission (DTX) feedback, to indicate that no TB is detected on the associated resource segment (which is different from NACK indicating the decoding failure).

As can be seen in FIG. 5, some uplink/downlink configurations are highly asymmetrical. For instance, configuration 5 includes only a single uplink subframe and 8 downlink subframes. Such configurations are sometimes denoted as heavy downlink. They may result in a relatively high latency which is caused by limited resources for transmitting ACK/NACK feedback on the uplink, corresponding to the transmitted downlink data. The latency is due to less opportunities for the uplink data. In such cases, more than one ACK/NACK feedback responses are bundled by applying logical AND. Consequently, ACK is only sent if all acknowledgements in a bundle are positive, otherwise, the entire bundle is retransmitted. This may result generally in more retransmission and thus, increased latency.

BRIEF SUMMARY

One non-limiting and exemplary embodiment provides apparatuses and methods for an efficient transmission and reception of data in special subframes which include both a downlink part and an uplink part.

According to an embodiment, an apparatus is provided for transmitting data in a frame with subframes of a wireless communication system, each subframe being either an uplink subframe accommodating uplink signal, a downlink subframe accommodating downlink signal or a special subframe including a downlink signal portion as well as an uplink signal portion, the apparatus comprising: a receiver for receiving a control signal including a special subframe configuration specifying the length of the uplink and/or downlink portion of the special subframe; a mapper for mapping user data and/or control data including feedback information in a transmission time interval, TTI, onto one subframe, wherein i) the length of a second TTI for mapping onto the uplink portion of a special subframe is shorter than a first TTI for mapping onto an uplink subframe, or ii) a first number of TTIs mapped onto the uplink subframe is larger than a second number of TTIs for mapping onto the uplink portion of a special subframe; and a transmitter for transmitting the mapped data.

According to an embodiment an apparatus is provided for receiving data in a frame with subframes of a wireless communication system, each subframe being either an uplink subframe accommodating uplink signal, a downlink subframe accommodating downlink signal or a special subframe including a downlink signal portion as well as an uplink signal portion, the apparatus comprising: a transmitter for transmitting a control signal including a special subframe configuration specifying the length of the uplink and/or downlink portion of the special subframe; a receiver for receiving data mapped on special subframes according to the special subframe configuration; and a mapper for demapping user data and/or control data including feedback information in a transmission time interval, TTI, from one subframe, wherein i) the length of a second TTI for mapping onto the uplink portion of a special subframe is shorter than a first TTI for mapping onto an uplink subframe, or ii) a first number of TTIs mapped onto the uplink subframe is larger than a second number of TTIs for mapping onto the uplink portion of a special subframe.

According to an embodiment a method is provided for transmitting data in a frame with subframes of a wireless communication system, each subframe being either an uplink subframe accommodating uplink signal, a downlink subframe accommodating downlink signal or a special subframe including a downlink signal portion as well as an uplink signal portion, the method comprising: receiving a control signal including a special subframe configuration specifying the length of the uplink and/or downlink portion of the special subframe; mapping user data and/or control data including feedback information in a transmission time interval, TTI, onto one subframe, wherein i) the length of a second TTI for mapping onto the uplink portion of a special subframe is shorter than a first TTI for mapping onto an uplink subframe, or ii) a first number of TTIs mapped onto the uplink subframe is larger than a second number of TTIs for mapping onto the uplink portion of a special subframe; and transmitting the mapped data.

According to an embodiment a method is provided for receiving data in a frame with subframes of a wireless communication system, each subframe being either an uplink subframe accommodating uplink signal, a downlink subframe accommodating downlink signal or a special subframe including a downlink signal portion as well as an uplink signal portion, the method comprising: transmitting a control signal including a special subframe configuration specifying the length of the uplink and/or downlink portion of the special subframe; receiving data mapped on special subframes according to the special subframe configuration; and demapping user data and/or control data including feedback information in a transmission time interval, TTI, from one subframe, wherein i) the length of a second TTI for mapping onto the uplink portion of a special subframe is shorter than a first TTI for mapping onto an uplink subframe, or ii) a first number of TTIs mapped onto the uplink subframe is larger than a second number of TTIs for mapping onto the uplink portion of a special subframe.

BRIEF DESCRIPTION OF THE SEVERAL VIEWS OF THE DRAWINGS

The above and other objects and features of the present disclosure will become more apparent from the following description and preferred embodiments given in conjunction with the accompanying drawings in which:

FIG. 4 is a schematic drawing illustrating the structure of a radio frame, being composed of 10 subframes for a 5 ms switch-point periodicity, FIG. 5 is a table showing the seven currently-standardized (static) TDD UL/DL configurations 0-6, the respective definitions of the 10 subframes and their switch-point periodicity, FIG. 8 is an exemplary table of special subframe configurations, FIG. 12 is a table illustrating configurations of uplink and downlink including additional special subframes, and FIG. 13 is a flow diagram illustrating the receiving and transmitting methods.

DETAILED DESCRIPTION

Figure 1:
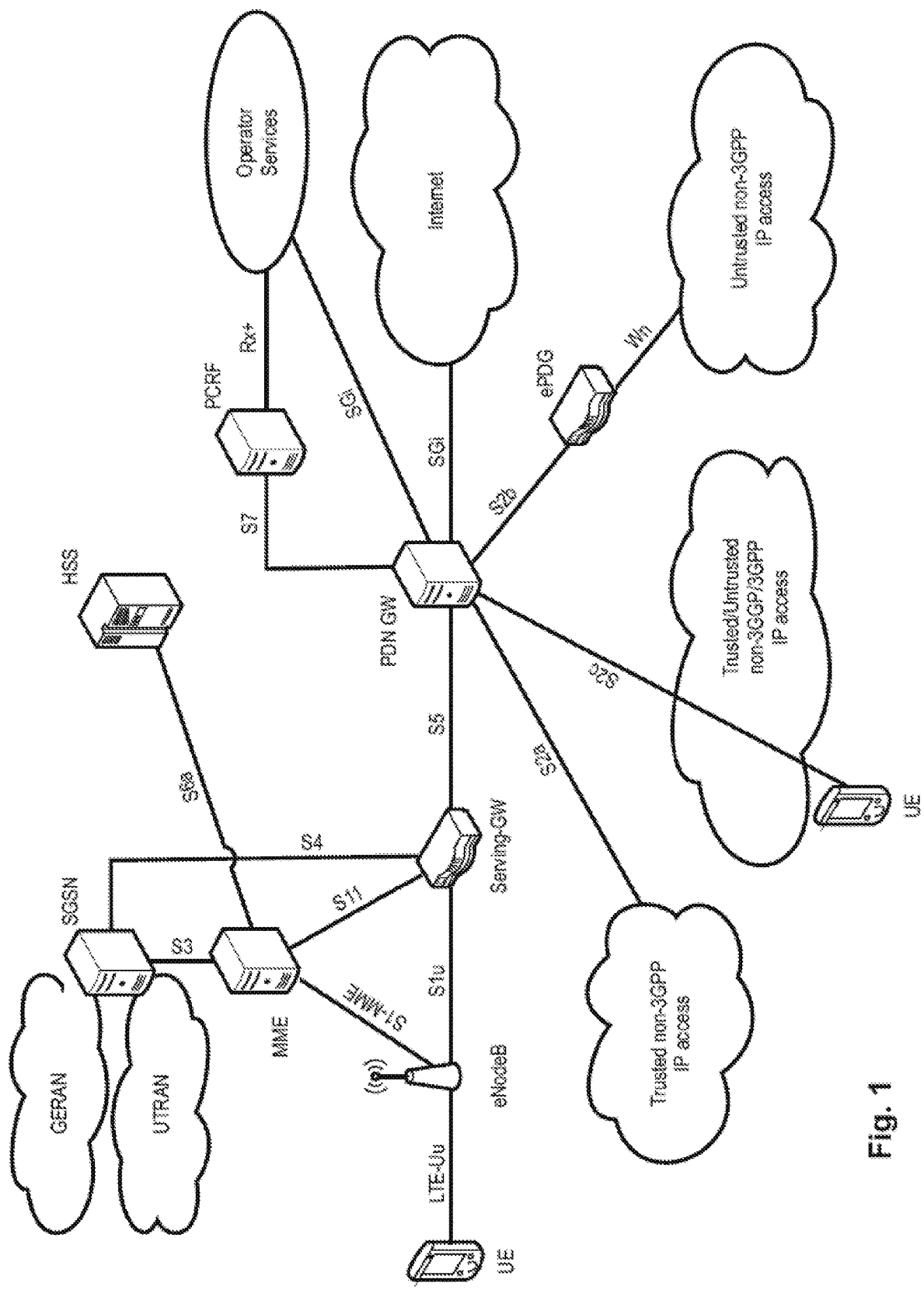
FIG. 1 is a block diagram showing an exemplary architecture of a 3GPP LTE system.
Figure 3:
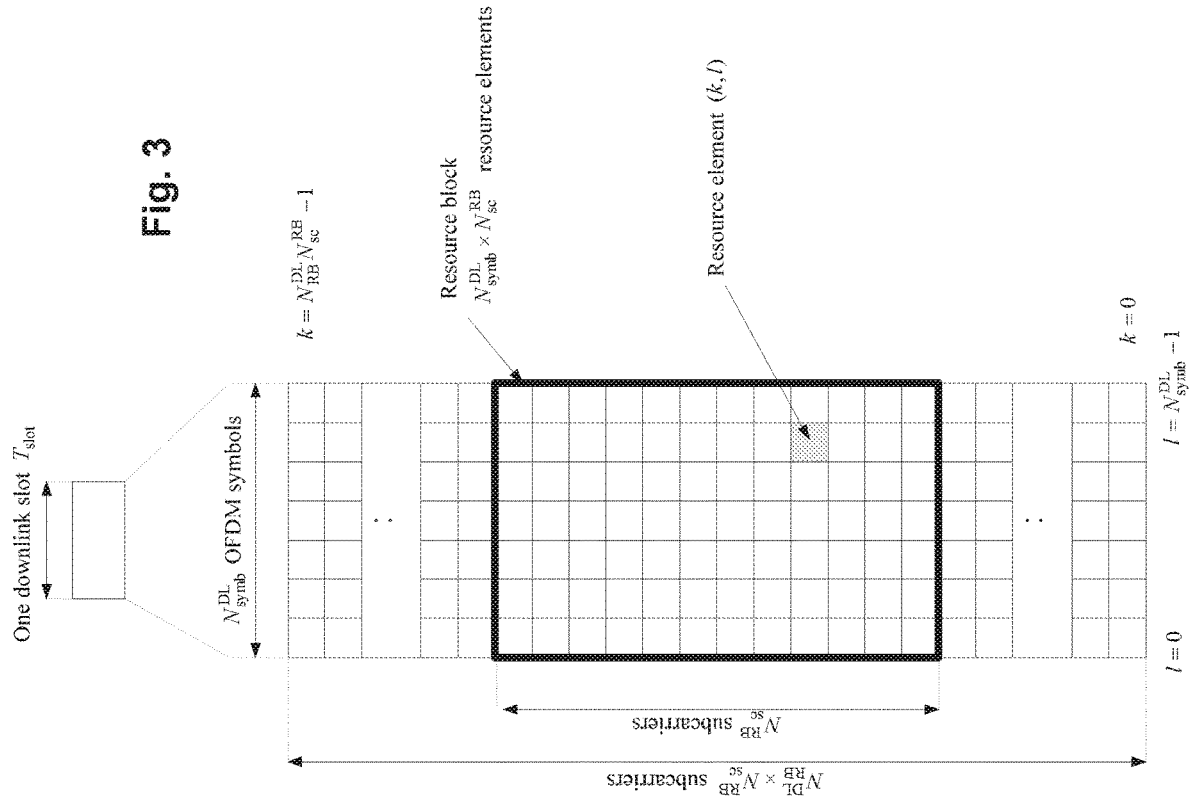
FIG. 3 is a schematic drawing showing an exemplary downlink resource grid of a downlink slot as defined for 3GPP LTE (as of Release 8/9)
Figure 2:
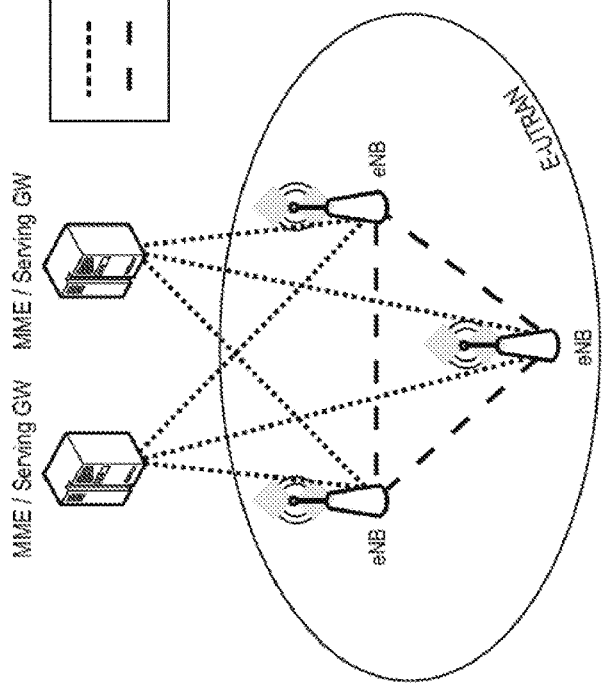
FIG. 2 is a block diagram showing an exemplary overview of the overall E-UTRAN architecture of 3GPP LTE.
Figures 6, 7:
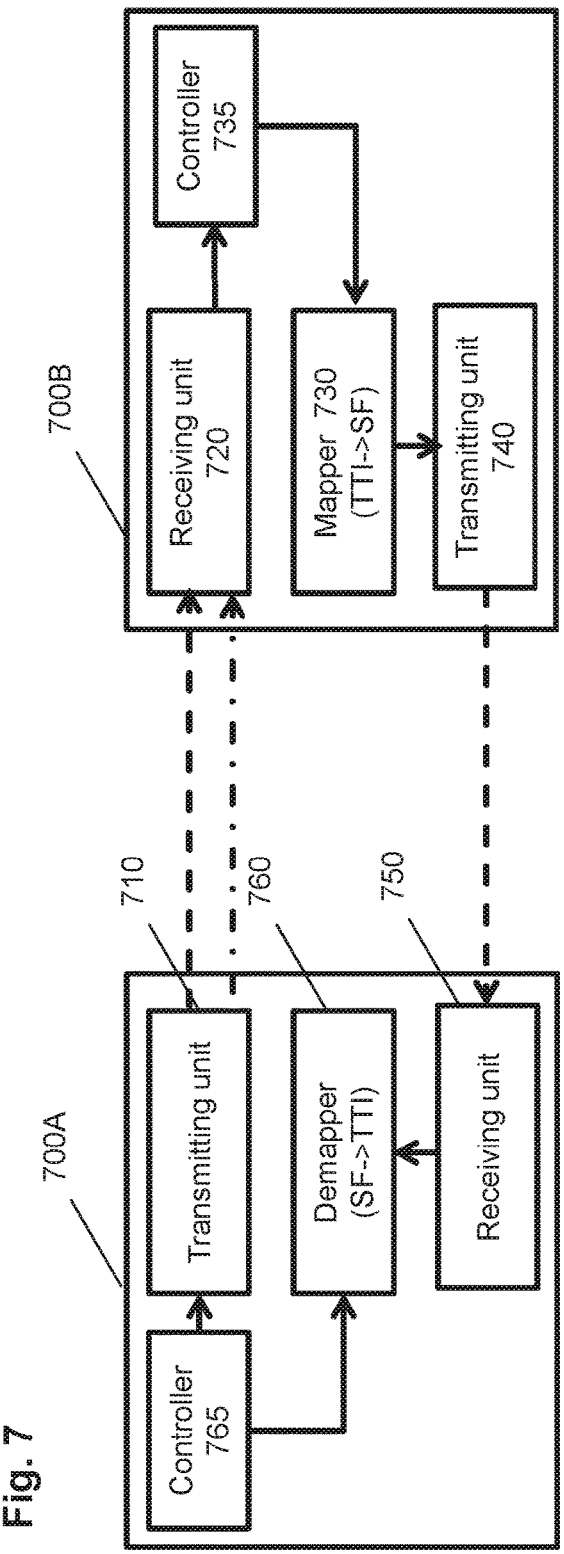
FIG. 6 is a table illustrating possible special subframe configurations.
FIG. 7 is a block diagram illustrating the apparatuses for transmitting and receiving data using different configurations of special subframes.

As shown in FIG. 6, the uplink portion (UpPTS) of a special subframe can only have one or two symbols. In case of LTE, these symbols are SC-FDMA symbols. The one or two symbols may be used for transmission of some reference signals (e.g., sounding reference signal, SRS) but are not enough to accommodate control data or user data. For instance, this short uplink portion is not sufficient to support PUSCH transmission (user data) or control data transmission including feedback information such as positive and negative acknowledgements (ACK/NACK) or channel quality information. In other words, the data and control signals provided for mapping onto the physical layer within one uplink TTI may be too long to be accommodated into the special subframe, even if puncturing is applied.

However, particularly in cases of high asymmetry between downlink and uplink capacity, it would be beneficial to use the additional capacity of the special subframes for transmitting of control or user data, particularly to improve the uplink capacity. For instance, as can be seen in FIG. 5, in the heavy downlink configuration such as configuration 5, the uplink subframe is only transmitted once per frame which may result in a longer latency of the feedback for the parallel downlink traffic. Moreover, there may insufficient resources for transmitting feedback so that acknowledgement bundling or multiplexing is applied. However, application of bundling or multiplexing may lead to increased losses of the feedback which on the other side also contributes to increasing the latency. This loss may occur for example if only one joint feedback bit needs to convey the ACK/NACK state for two transport blocks. Since it is more harmful to erroneously omit a NACK compared to an ACK, such a joint feedback bit would indicate NACK unless for both transport blocks an ACK is determined, in which case the joint feedback would indicate ACK.

In order to maintain backward compatibility with an existing system and/or to avoid interference issues, it is desirable to align the transmission structure to the legacy TDD subframes. In particular, the uplink/downlink subframe assignment, the switching periodicity and the special subframe structure should be maintained.

According to the present disclosure, special subframes may be used for reducing the latency.

This may be achieved in conjunction with employing a short transmission time interval (sTTI), i.e., a TTI shorter then length of a subframe. In particular, in LTE typically TTI has a length of 1 ms corresponding to the length of the subframe. Accordingly, a single TTI is typically mapped onto a single subframe. With a short TTI, data may be independently mapped to the respective uplink and downlink portions of the special subframes, too. A short TTI also reduces latency.

Better latency than previous generations of 3GPP Radio Access Technologies (RATs) was one performance metric that guided the design of the LTE. Packet data latency is important not only for the perceived responsiveness of the system; it is also a parameter that indirectly influences the throughput. HTTP/TCP is the dominating application and transport layer protocol suite used on the internet today. The typical size of HTTP-based transactions over the internet are in the range from a few 10's of Kbytes up to 1 Mbyte. In this size range, the TCP slow start period is a significant part of the total transport period of the packet stream. During TCP slow start the performance is latency limited. Hence, improved latency can improve the average throughput for these type of TCP-based data transactions. In addition, to achieve very high bit rates (in the range of Gbps with Rel-13 CA), UE L2 buffers need to be dimensioned correspondingly. The longer the Round Trip Time is, the bigger the buffers need to be. The only way to reduce buffering requirements in the UE and eNB side is to reduce latency.

Radio resource efficiency could also be positively impacted by latency reductions. Lower packet data latency could increase the number of transmission attempts possible within a certain delay bound; hence higher BLER targets could be used for the data transmissions, freeing up radio resources but still keeping the same level of robustness for users in poor radio conditions. The increased number of possible transmissions within a certain delay bound could also translate into more robust transmissions of real-time data streams (e.g., VoLTE), if keeping the same BLER target. This would improve the VoLTE voice system capacity.

The latency can be reduced by TTI shortening and by reducing processing times. In particular, TTI lengths between 0.5 ms and one OFDM/SC-FDMA symbol may be beneficial, taking into account impact on reference signals and physical layer control signaling, as well as backwards compatibility, i.e., allowing normal operation of UEs of the earlier releases on the same carrier.

According to the present disclosure, a shorter TTI is used to map user data or control data onto an uplink or downlink portion of the special subframe. The short TTI is shorter than the duration of the subframe. In particular, the short TTI may correspond (be equal) to the duration of a downlink or an uplink portion of the special subframe or be shorter than that.

In order to further provide a possibility of mapping data into uplink portion (and/or downlink portion) of the special subframes, the structure of the special subframes is modified with respect to the legacy special subframes (cf. FIG. 6).

FIG. 7 shows a communication between a base station (eNB) and a terminal (user equipment, UE). Accordingly, a terminal may include a device 700B for transmitting data in a frame with subframes of a wireless communication system. The wireless communication system may be the LTE system, which may operate as a cellular network and/or in a device-to-device mode. The frame may then correspond to the radio frame which is currently defined to include 10 subframes as described above with reference to FIG. 4. Each such subframe is either an uplink subframe accommodating uplink signal, a downlink subframe accommodating downlink signal or a special subframe including a downlink signal portion as well as an uplink signal portion.

In the uplink direction, the terminal (UE) transmits data to the base station. In the downlink direction, the terminal receives data from the base station. The data may be user data (i.e., data generated by a user application possibly including control overhead of the higher layers) or control data such as layer 1/layer 2 signaling including feedback information. The feedback information may comprise HARQ positive or negative acknowledgements, channel quality indication, rank indicator or PMI.

It is noted that the same device may also be implemented in a relay node communicating with the base station via backhaul link.

The device 700B comprises a receiver 720 and a transmitter 740. The receiver as well as transmitter may embody features necessary for reception and transmission of data such as antennas, amplifiers, or the like, implemented for instance within a dedicated or programmable circuitry (hardware).

The receiver 720 is configured for receiving a control signal including a special subframe configuration specifying the length of the uplink and/or downlink portion of the special subframe. The control signal may be control signaling transmitted on any layer. For instance, the control signal may be received via cell broadcast within system information blocks. The control signal may be provided semi-statically via dedicated RRC protocol or via a L1/L2 control signal such as the DCI in LTE, where the control signal could be valid to a single UE, or to a group of UEs including all UEs in the cell.

Transmitting the control signal via a cell broadcast such as in a system information block of LTE has the advantage that the information can be conveyed to multiple recipients with little relative overhead. This is particularly advantageous for cells where all UEs are expected to operate in the same way as far as the scope of this disclosure is concerned. For example a small cell, i.e., a cell that has a small coverage area and/or few connected UEs, can operate beneficially in such a manner. Conveying the control signal via a dedicated RRC message has the benefit of a possible acknowledgement by the receiver that the control signal has been received and processed correctly. Therefore this is advantageous if an unsynchronized behavior due to errors should be avoided, especially when the configuration conveyed by the control signal is not expected to change in a timescale of up to 320 subframes. Conveying the control signal via a L1/L2 control signal has the main benefit in the possibility to quickly adapt the configuration to ad hoc needs, such as a highly fluctuating traffic change due to the data traffic model. Such a L1/L2 control signal may additionally advantageously be directed to a group of UEs, identified by a common radio network temporary identifier (RNTI) that is applied, in a similar fashion as dynamic TDD reconfiguration messages are supported in LTE (cf. 3GPP TS 36.213, v12.8.0, Section 13.1). The utilization of a dedicated RRC message and a L1/L2 control signal has a benefit in case of large cells, i.e., supporting a wide area or many connected UEs. In such a case, especially in TDD the UEs close to the cell center and the UEs close to the cell edge face large propagation delays, so that their timing advance offset to compensate for the propagation delay will need to be different. Consequently, a UE close to the cell edge may need a longer GP than a UE close to the cell center, so that a UE close to the cell center would be generally allowed to have a longer DwPTS+ UpPTS (uplink portion and/or downlink portion of the special subframe) length than a UE close to the cell edge.

The special subframe configuration is advantageously one of a set of predefined configurations. These configurations in the set may differ in length of the uplink portion, downlink portion and/or the guard period between them. For instance, in LTE, the special subframe has a length of 14 symbols, and the subframe configuration indicates which of the symbols are assigned for uplink portion, downlink portion and the GP. It is noted that for some scenarios, configurations having GP with zero symbols (i.e., no GP between the last symbol of the downlink portion and the first symbol of the uplink portion) may also be considered. Particularly for the case that the GP is shorter than one symbol, a part or all of the cyclic prefix of the first symbol of the uplink portion might be used to accommodate the timing advance offset, i.e., the UE may be allowed to omit transmission of part of the samples constituting that cyclic prefix.

The received special subframe configuration is then adopted by the device. For instance, a controller 735 configures the device 700B accordingly.

The device 700B further includes the mapper 730 for mapping user data and/or control data including feedback information in a transmission time interval, TTI, onto one subframe.

In particular, the mapper receives data within a TTI and maps the received data onto the uplink portion of the special subframe or onto an uplink subframe for transmission. The mapping may include for instance in case of LTE the SC-FDMA the symbol forming. The data is received by the mapper from within the device 700B. For instance, user data may be received from the medium access control (MAC) layer. The control data may be generated in or between the MAC (layer 2) and the physical layer (layer 1). For instance, the acknowledgements may be generated by the HARQ entity, whereas the channel state feedback may be generated in response to physical layer measurements of the channel.

The length of a second TTI (short TTI) for mapping onto the uplink portion of a special subframe may be shorter than a first TTI (legacy TTI) for mapping onto an uplink subframe. Alternatively, a first number of TTIs mapped onto the uplink subframe is larger than a second number of TTIs for mapping onto the uplink portion of a special subframe. Here, the length of the TTI may be equal for the mapping onto special and uplink subframes. For instance, a preconfigured length of a TTI may be used which is shorter than a legacy TTI length, or in other words the length of a single subframe. However, it is noted that in general, the disclosure is not limited to the same TTI length. Merely, the length and/or the number of TTIs is to be selected for the portions of the special frames as well as for the uplink or downlink frames to match their duration.

The device 700B further comprises a transmitter 740 for transmitting the mapped data in the respective uplink subframe and the uplink portion of a special subframe.

Correspondingly, apparatus 700A for receiving data in the frame with subframes of the wireless communication system may be a part of a base station.

The apparatus 700A includes a transmitter 710 for transmitting a control signal including a special subframe configuration specifying the length of the uplink and/or downlink portion of the special subframe. Accordingly, the base station, which has information concerning the cell resources and quality and also performs scheduling, is capable of configuring the special subframe configuration to be used in communication with the UEs.

Moreover, the apparatus 700A further comprises a receiver 750 for receiving data mapped on special subframes according to the special subframe configuration. These are the uplink data transmitted by the respective UEs in the cell.

A mapper 760 then demapps the data (user data and/or control data including feedback information) in a transmission time interval, TTI, from one subframe, wherein the length of a second TTI for mapping onto the uplink portion of a special subframe is shorter than a first TTI for mapping onto an uplink subframe, or a first number of TTIs mapped onto the uplink subframe is larger than a second number of TTIs for mapping onto the uplink portion of a special subframe.

It is noted that the apparatus 700A may include a controller 765, which controls the transmitter 710 to transmit an appropriate configurations and which controls the mapper 760 accordingly to demap the data received.

The above description concentrated on the uplink configuration and transmission. However, the present disclosure is not limited thereto. In particular, the receiver of the apparatus 700B (which may be a part of a UE) can also be configured to receive data in the downlink, including the downlink portion of the special subframe(s). For instance, based on the special subframe configuration received from the base station, the apparatus 700B receives downlink data in the specified TTI or a plurality of TTIs within the downlink portion of the special subframe. The downlink data may include user data (PDSCH) and/or control data such as L1/L2 control signals conveying scheduling information, for example the downlink control information (DCI) carried by PDCCH/EPDCCH in LTE.

As shown in FIG. 7, the transmitter 710 of the apparatus 700A may provide the receiver 720 of the apparatus 700B not only with the configuration of special frames and/or uplink/downlink frames (dashed line), but also with data mapped according to the configuration (dash-dotted line). On the other hand, the transmitter 740 of the apparatus 700B provides the receiver 750 of the apparatus 700A with the uplink data (user or control data).

Correspondingly, the apparatus 700A which may be implemented in a base station has the transmitter, which may be additionally configured to transmit data to a UE or a plurality of UEs in the downlink portion of the special subframe(s) as configured by the special subframe configuration.

FIG. 8 (in its parts 8a, 8b, and 8c) illustrates an example of an extended table of configurations for special subframes.

Accordingly, the special subframe configuration takes a value out of a value set (0-65), wherein some configurations in the set differ with respect to the length of the downlink portion, uplink portion and the length of the TTI.

In particular, the first 9 configurations in FIG. 8 correspond to configurations described with reference to FIG. 6. Configurations 10 to 65 enable accommodating of multiple short TTI's for downlink and/or uplink. In order to achieve this, the length of the downlink portion and/or uplink portion of the special subframe are modified to provide a larger number of choices. In some of the cases, the guard period between the downlink portion and the uplink portion is shortened to provide more space (symbols) for uplink and downlink short TTI. In particular this can be seen in FIG. 8, configurations with longer uplink portion of the special subframe are provided for both normal and extended cyclic prefix.

In the table, special configurations numbered from 0 to 65 are provided. Configurations 21 to 65 provide a longer uplink portion of the special subframe, namely uplink portion of the length between 3 and 11 SC-FDMA symbols. Various lengths of the downlink portion are possible resulting in various lengths of the guard period (it is assumed that special subframe has 14 symbols and at least one symbol for guard period).

FIG. 8 is merely exemplary. A different number or order of possible configurations may be provided. For instance, in order to limit number of bits necessary for signaling, the number of special subframe configurations may be limited to 16 (4 bits), 32 (5 bits), 64 (6 bits) or 128 (7 bits). Moreover, there may be configurations resulting in guard period with length of less than one symbol or even zero. FIG. 8 should not be understood as tying the special subframe configuration index to a specific configuration; for example it is not important whether configuration number 19 represents 7 symbols in DwPTS and 2 symbols in UpPTS, or 6 symbols in DwPTS and 3 symbols in UpPTS. Likewise, FIG. 8 should not be understood to mean that a certain combination of symbols in DwPTS/UpPTS for a normal cyclic prefix implies that in case of an extended cyclic prefix the combination of symbols needs to be exactly as given in FIG. 8. For example, FIG. 8 lists configuration number 19 as supporting 7 symbols in DwPTS and 2 symbols in UpPTS for the case of a normal cyclic prefix in both uplink and downlink. However in contrast to FIG. 8, it is possible that configuration number 19 supports 6 symbols in DwPTS and 2 symbols in UpPTS for the case of an extended cyclic prefix in both uplink and downlink (i.e., the numerology shown for configuration number 18 for that case).

The table shown in FIG. 8 provides the advantage of supporting the first 10 configurations which are currently specified for LTE legacy system (up to release 13). The additional configurations are new and may be supported starting from release 14.

FIG. 8 shows many configurations for both normal cyclic prefix and extended cyclic prefix in the downlink as well as in uplink. However, the present disclosure is not limited thereto. The number of configurations may be reduced. For instance, in order to support latency reduction, it may be beneficial not to support extended cyclic prefix in uplink or in downlink or in both of them.

Cyclic prefix (CP) is a portion preceding each symbol in LTE (in downlink OFDM symbol, in uplink SC-FDMA symbol). In LTE, the length of the cyclic prefix is ca. 5 microseconds. The purpose of the cyclic prefix is to separate the symbols to be able to compensate for frequency shifts occurring for instance due to high mobility. Apart from the normal CP, LTE also defines an extended CP, which has a duration of ca. 17 microseconds. This is to ensure that even in large suburban and rural cells, the delay spread should be contained within the CP.

Since not all configurations are necessarily attractive for certain uplink and/or downlink TTI lengths and cell sizes, the number of configurations may be further reduced, i.e., not all possible configurations of uplink and downlink portion lengths are to be listed in the table and thus available for configuring. For example, a close inspection of FIG. 8 shows that configurations number 55, 59, 62, 64, 65 represent configurations that are only applicable if the cyclic prefix is "normal" in downlink as well as in uplink, and therefore have a limited potential applicability. Therefore if at least two of these configurations are unavailable, at most 64 configurations are available that can be efficiently represented by 6 bits.

In addition or alternatively, special subframe configuration value (index in the first column of the table in FIG. 8) may be unique only for certain TTI length. For instance, configuration #10 (with index 16) may indicate number of DwPTS symbols (OFDM symbols) 2 and UpPTS (SC-FDMA) symbols 2 for TTI length 0.2 ms in downlink and uplink portion, but number of DwPTS symbols 5 and 5 for TTI length 0.5 ms. As such, the interpretation of the configuration may take the TTI length as a parameter, where the TTI length is configured by a configuration signal that is not tied to the special subframe configuration.

Alternatively, the special subframe configuration may imply a TTI length at least for the uplink portion and/or the downlink portion. For example, special subframe configurations indicating a number n1 of DwPTS symbols imply that the corresponding downlink TTI is at most n1 symbols long. Likewise, special subframe configurations indicating a number n2 of UpPTS symbols imply that the corresponding uplink TTI is at most n2 symbols long.

In general, the special subframe configuration advantageously takes a value (index, e.g., illustrated in the first column of Table in FIG. 8) out of a value set in which at least a first value indicates length of the uplink portion of the special subframe which is not sufficient to accommodate the data in the second TTI, and a second value indicates length sufficient to accommodate the data in the second TTI but not data in the first TTI.

In other words, special subframe configurations include at least one legacy configurations including uplink portion length too short to accommodate even a short TTI and at least one new configuration with uplink portion length sufficient to accommodate a short TTI (but not sufficient to accommodate the TTI for normal uplink subframes). This may be the case for instance if the length of the short TTI is ½ of the legacy TTI. In such case configurations 0 to 9 in FIG. 8 cannot accommodate such short TTI since they provide uplink portion length of only up to 2 symbols. However, configurations 38 to 65 could accommodate such short TTI.

The mapper 730 is then advantageously configured to:
  map onto the uplink portion physical layer signals including sounding reference signals if the special subframe configuration takes the first value; and
  map onto the uplink portion control data including positive or negative acknowledgements for downlink data and/or channel state information if the special subframe configuration takes the second value; or
  map onto the uplink portion user data if the special subframe configuration takes the second value.

In other words, if the uplink portion of a special subframe configuration is not sufficiently long enough to accommodate any (or the configured) TTI, such an uplink portion may be used for providing pilot signals such as sounding reference signals. Alternatively or in addition such an uplink portion may be used to transmit some other physical layer signals such as preambles used for (initial) random access, i.e., for collision avoidance. On the other hand, if the uplink portion of the special subframe configuration is sufficiently long to accommodate the TTI, the uplink portion may be used for the transmitting of user data or control signals or both of them.

As already mentioned above, each special subframe may consist of a plurality of symbols and the special subframe configuration indicates the number of symbols for the downlink portion and/or for the uplink portion, and the special subframe may further comprise a guard period of one or more symbols separating the downlink portion and the uplink portion.

However, it is noted that the special subframe configuration may in general also be defined only by the length of the downlink portion or only by the length of the uplink portion in case the guard period and the length of the special subframe is fixed. Any alternatives are possible as long as the special subframe configuration is capable of indicating the assignment of particular symbols to a particular purpose (uplink, downlink, guard period).

Figures 9, 10:
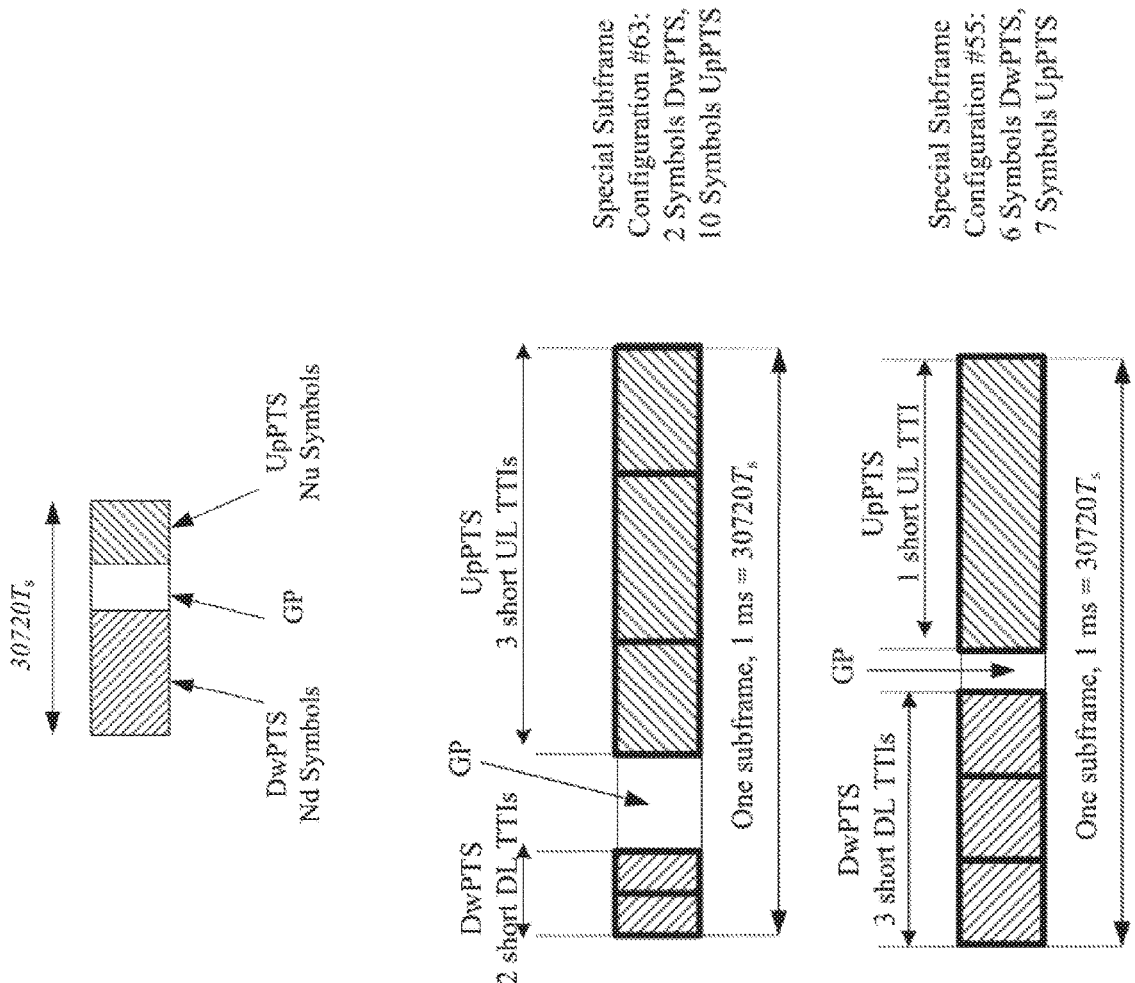
FIG. 9 is a schematic drawing illustrating structure of a special subframe.
FIG. 10 is a schematic drawing illustrating two examples of mapping of transmission time intervals onto special subframes.

FIG. 9 shows a detail structure of the special subframe already illustrated in FIG. 4. In particular, a special subframe may start with Nd downlink symbols (DwPTS), include a guard period (GP) separating these downlink symbols from the following Nu uplink symbols (UpPTS). In the TDD LTE, the special subframe has the length of 30720 sample periods Ts which is equal to 1 ms.

FIG. 10 illustrates some exemplary mappings of TTIs onto a special subframe. For instance, in the upper example the length of the TTI differs for the uplink part of a special subframe and a downlink part of a special subframe. At the same time the number of TTIs differs for the uplink part of the special subframe and for the downlink part of the special subframe. In particular, in this example two short downlink TTIs are mapped onto the downlink portion of the special subframe. Moreover, three short uplink TTIs are mapped onto the uplink portion of the special subframe. The length of the uplink TTI is greater than the length of the downlink TTI. At the same time the number of downlink TTIs is smaller than the number of uplink TTIs.

The bottom example of FIG. 10 shows another configuration, in which the number of downlink TTIs is greater than the number of uplink TTIs. At the same time, the length of the downlink TTI is smaller than the length of the uplink TTI. The guard period in this example is also shorter with respect to the guard period of the upper example. A shorter guard period may be acceptable especially for small cells due to smaller timing advance requirements.

The length of the TTI determines the amount of data which may be conveyed within the TTI. The number of TTIs determines the frequency with which the data can be collected for mapping onto the resource grid. Together the length of the TTI and their number thus have an impact on the latency. As already mentioned above, the present disclosure is not limited to these examples. For instance, there may be a single TTI mapped on the downlink portion of the special subframe and a single TTI mapped on the uplink portion of the special subframe. Such uplink and downlink TTI may be of the same length or of a different length depending on the special subframe configuration, i.e., on the number of symbols per portion. Alternatively, a short TTI of the same preconfigured length may be applied to both uplink and downlink, with the number of such short TTIs being different for the uplink and downlink portions.

Figure 11:
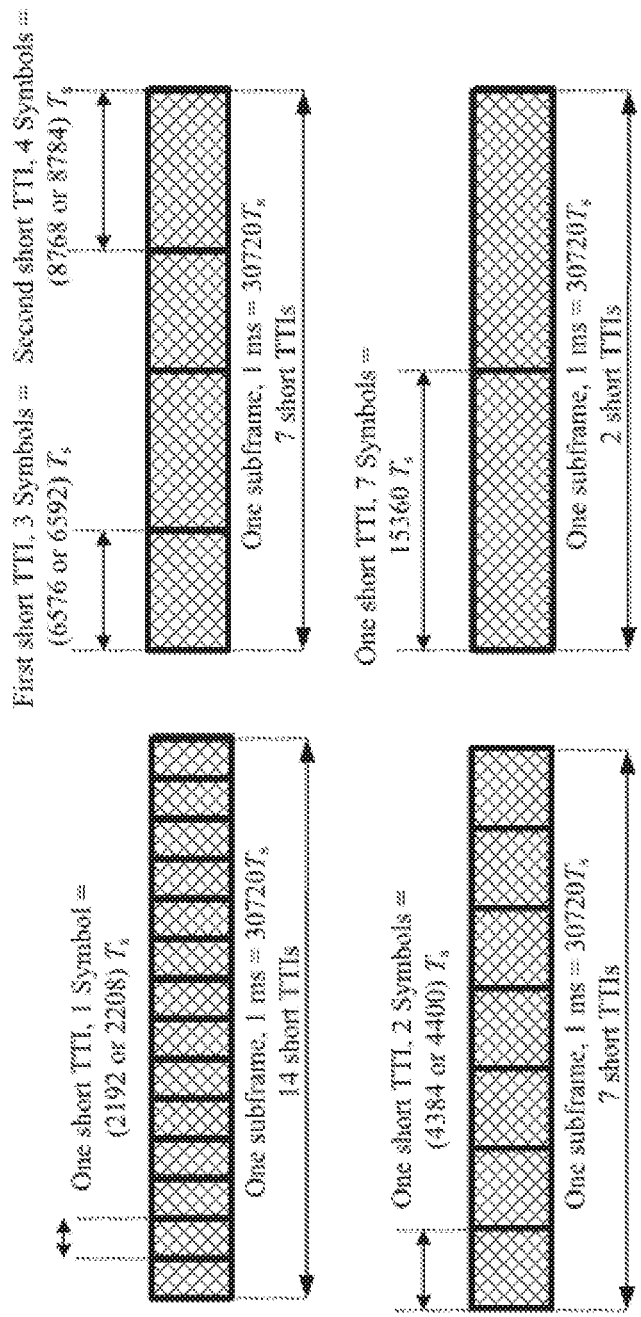
FIG. 11 is a schematic drawing illustrating four examples of mapping of transmission time intervals onto uplink and downlink subframes.

In addition, shorter TTI is may also be applied to uplink subframes, downlink subframes or both of them as is shown in FIG. 11. In particular, FIG. 11 shows four examples (assuming a normal CP for uplink symbols as well as for downlink symbols, without loss of generality) in which one 1 ms subframe accommodates 14, seven, four, or two TTIs. Example (a) illustrates subframe onto which data in 14 TTIs are mapped. Each TTI has a length of one symbol (OFDM symbol for downlink, SC-FDMA symbol for uplink). Thus, a TTI correspond to the duration of one symbol. The major advantage of a very short TTI such as one symbol is the ability to process the data very quickly, e.g., the decoding procedure can be started immediately after the reception of the symbol. In contrast, a 1 ms TTI implies that the whole subframe (=1 ms) needs to be received before the decoding procedure can be started. Therefore in case of a short TTI, the data as well as the corresponding ACK/NACK feedback are available much sooner at the receiver, and the ACK/NACK can be conveyed back to the transmitted much earlier than for the 1 ms TTI case.

Example (b) shows one subframe into which seven short TTIs are mapped, each having the duration of two symbols. Example (c) shows one subframe into which for TTIs are mapped. This TTI is differ in their size. In particular, two TTIs with a length of three symbols and two TTIs with a length of 4 symbols can be seen, mapped alternately (TTI (3 symbols), TTI (4 symbols), TTI (3 symbols), TTI (4 symbols)). Finally, example (d) shows two TTIs per subframe, each of the two TTIs having the length of seven symbols. While these TTI lengths lose some of the gains mentioned for the one symbol TTI, there is the advantage that these TTIs can support larger transport blocks. Especially considering advanced forward error correction schemes such as turbo coding or low-density parity check coding, the coding gain increases with the length of the encoded transport block. Another advantage is that usually the transmit power is limited per transmitted symbol, so that a TTI comprising multiple symbols can convey more energy and therefore obtain a higher SINR compared to a single symbol as far as the total energy per transport block or TTI is concerned. This is particularly advantageous for uplink transmissions where the transmit power is usually more limited that for downlink due to the hardware cost for the power amplifiers employed in an eNB and a UE.

As described above, in LTE currently the uplink portion of the special subframes cannot be used for transmitting control or user data. Since it is very short (1-2 symbols), the uplink portion is only used to transmit some uplink signals such as sound reference signals and/or preambles for the random access (initial access). Random access is used by the UEs to obtain channel access. It is an unscheduled access in which collisions may occur. In order to enable distinguishing the UEs in the random access, pseudo-random sequences with good cross-correlation properties and good auto-correlation properties are used. In particular, a UE selects randomly a sequence (preamble) and transmits it together with its identifier to the base station to obtain resources for transmission.

According to one example of the present disclosure, the uplink portion of the special subframe consists of a data portion onto which user data and/or control data is mapped within one or more TTIs and a signal portion which carries sounding reference signal and/or a random access channel preamble. For instance, the uplink portion of the special subframe may accommodate one or more TTIs and, in addition, a predetermined number of symbols (e.g., 1 or 2) forming the signal portion for transmitting the reference signals and/or initial access preambles. Advantageously, the symbols of the signal portion are the last symbols of the uplink portion. In particular, this configuration is compliant with the configuration of the current LTE system. Compliance therewith enables using the sounding reference signal by UEs of different standard versions and avoids interfering with the PUSCH transmissions.

According to an embodiment, new special subframes are introduced within a radio frame apart from the legacy switching subframes 1 and 6 shown in FIG. 5. Such new special subframes may be available for UE starting from release 13 of LTE, in which a shorter TTI is configurable.

Such new special subframes are advantageously configured in those subframes which are configurable as Multimedia Broadcast Single Frequency Network (MBSFN) subframes in LTE.

One of the targets of MBSFN is supporting of multimedia (e.g., TV) multicast or broadcast over LTE.

In particular, according to TS 36.211, v12.8.0, "Physical channels and modulation" clause 6.1 which is incorporated herewith by reference, a subset of the downlink subframes in a radio frame on a carrier supporting PDSCH transmission can be configured as MBSFN subframes by higher layers. Each MBSFN subframe is divided into a non-MBSFN region and an MBSFN region. The non-MB SFN region spans the first one or two OFDM symbols in an MBSFN subframe where the length of the non-MBSFN region is given by Table corresponding to Table 6.7-1 from the above cited TS 36.211. Transmission in the non-MBSFN region shall use the same cyclic prefix length as used for subframe 0. The MBSFN region in an MBSFN subframe is defined as the OFDM symbols not used for the non-MBSFN region.

TABLE 1

| Subframe | Number of OFDM symbols for PDCCH when $N_{RB}^{DL} > 10$ | Number of OFDM symbols for PDCCH when $N_{RB}^{DL} \le 10$ |
| --- | --- | --- |
| Subframe 1 and 6 for frame structure type 2 | 1, 2 | 2 |
| MBSFN subframes on a carrier supporting PDSCH, configured with 1 or 2 cell-specific antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

In an MBSFN subframe, cell-specific reference signals are only transmitted in the non-MBSFN region of the MBSFN subframe. The configuration of the MBSFN subframes is performed via RRC protocol. In particular, the configuration is transmitted within system information block (SIB) number 2 from the eNodeB (base station) to the terminal(s). Within the RRC, the MBSFN configuration is embedded in Information element mbsfn-SubframeConfig-List, which also defines the subframes that are reserved for MBSFN in downlink.

Configurability of the MBSFN subframes are special subframes providing the advantage of reduced interference and backward compatibility. In particular, as mentioned above, MBSFN subframes transmit control and reference signals only in the first two OFDM symbols. Accordingly, the remaining portion of an MBSFN may be used for mapping uplink signal there on without risk of misinterpreting the uplink signals by the legacy UEs as reference or PDCCH signals. As has been also shown in FIG. 8, in a special subframe having only two to three downlink OFDM symbols reserved for downlink and small guard period (suitable for small cells with small time advance), up to 11

SC-FDMA symbols might be usable for uplink. Such configuration is also possible with MBSFN subframes. They provide the advantage of reducing latency especially for heavy downlink since they may be used to convey HARQ feedback and/or PUSCH sTTIs, i.e., uplink user data.

In other words, in this embodiment, the control signal further comprises an uplink/downlink configuration specifying for each subframe of a frame whether it is downlink, uplink or special subframe, and the uplink/downlink configuration includes a first set of subframes that are configurable for multicast or broadcast, and a second set of subframes that are not configurable for multicast or broadcast.

FIG. 12 (in its parts 12a to 12h) illustrates an example of uplink/downlink configurations including such additional special subframes which are marked by "A" in the figure. In particular, configurations with index 0, 1, 2, 3, 4, 5, and 6 correspond to the respective configurations of the table in FIG. 5 and thus do not include additional special subframes. New configurations have been added based on these seven legacy configurations by replacing one or more subframes configurable for MBSFN (i.e., subframes number 3, 4 and 7, 8, 9) with additional special subframes.

Another advantage of using MBSFN subframes for those subframes is that already some HARQ timing relation between downlink and uplink is defined. This is currently established in Table 10.1.3.1-1 of the TS 36.213, v12.8.0 where for subframes 3, 4, 7, 8, 9 (i.e., those subframes that are configurable for MBSFN) at least one UL/DL configuration is available that defines the HARQ timing relation between downlink data and corresponding uplink ACK/NACK; therefore those established timing relations could be re-used without great additional efforts. Moreover, subframe number six can be a beneficial candidate because it is a special subframe already in some configurations.

The additional special subframes (A) advantageously take into account the length of the (short) TTI configurable for uplink. This enables transmission of control data and user data in the uplink part of the special subframes as already also discussed above. In particular, sPUCCH and sPUSCH transmissions are possible. With "sPUCCH" and "sPUSCH" the respective short versions of physical uplink control channel on physical uplink shared channel are denoted. The short versions of the physical uplink channels differ from the currently used PUCCH and PUSCH by the support of a short TTI (sTTI) or a plurality of possible configurable sTTIs.

Special subframe configurations advantageously differ for the first and the second sets of subframes of the uplink/downlink configuration, i.e., for the subframes 3, 4, 7, 8, 9 (A) configurable for MBSFN and for the remaining subframes 1, 6 (S). However, since subframe #6 may be used as both a legacy downlink subframe or a special subframe, both or any of special subframe configurations may be configurable for the subframe.

In other words, in order to facilitate coexistence with the legacy UEs, it may be advantageous to have two independent special subframe configurations or configurations sets applicable for the legacy special subframes (S) and the additional special subframes (A).

It is noted that FIG. 12 shows many different uplink/downlink configurations. However, the present disclosure is not limited to providing all these combinations as configurable. Rather, the set of configurable uplink/downlink configurations may be limited to a subset of the table shown in FIG. 12. Selection of the set size is a tradeoff between the configuration flexibility (provided by a large choice, i.e., by all possible configurations included in the set) and between the memory and transmission capacity required to store and signal the respective selected configuration. In summary, according to one embodiment, the wireless communication system is a long term evolution (LTE), the first set of subframes are from among those subframes that are configurable as multicast broadcast single-frequency network, MBSFN, subframes, or the second set of subframes are subframes with number 1 and/or 6.

In the above described example, various configurations of special subframes have been shown and discussed. In wireless communication systems, there are typically several different channels mapped onto the available resources. These channels may carry different types of signals (control or user data) with different requirements concerning reliability and latency. Accordingly, it may be advantageous to employ different special subframe configurations for different channels. In particular, the shared channel (PDSCH) may employ a different TTI length or number of TTIs than the control channel (PUSCH). For instance, uplink shared channel may occupy more symbols than the uplink control channel. This may be achieved by configuring, for the uplink shared channel (which may convey user data) a larger TTI and/or more TTIs within the uplink portion of the special subframe than for the uplink control channel.

It is noted that the above description exemplifies the present disclosure based on the LTE system. However, the present disclosure is not limited thereto. Any wireless communication system employing special subframes which are used to accommodate both uplink parts and downlink parts may embody the present disclosure. Moreover, the above examples manly refer to a communication between a base station and the terminal. However, in general, the above approach may also be used in communication between two nodes such as two user equipments (device to device communication). In such case, the terms "uplink" and "downlink" would merely refer to a first and a second direction of transmission (i.e., from UE1 to UE2 and from UE2 to UE1 respectively).

Currently, the uplink/downlink configuration and special subframe configuration are transmitted from the base station to the UEs over RRC protocol within the system information. However, it may be beneficial to enable reconfiguration of the sTTI length and/or short-TTI special subframe positions and lengths dynamically.

According to an embodiment, thus the control signal carrying the special subframe configuration is transmitted within downlink control information as layer 1/layer 2 signaling.

Such dynamic configuration may be performed in a similar manner as in the enhanced Interference Mitigation and Traffic Adaption (eIMTA), which is a mechanism for reconfiguring TDD uplink/downlink configuration in dependency on load and interference in and between the cells. In particular, eIMTA reconfiguration is performed using layer 1 signaling, namely by employing a downlink control information (DCI) of format 1C. Format 1C is used in the LTE for very compact transmission of PDSCH assignments, where the PDSCH transmission is constrained to QPSK such as for paging messages and broadcast information messages among which the uplink/downlink configuration may be transmitted.

Thus, DCI format 1C may be advantageously used for reconfiguring the uplink/downlink configuration as well as the special subframe configuration for the purpose of short latency as described in the above embodiments and examples.

In order to ensure backward compatibility and maintain the system design, a special RNTI may be used for short-latency reconfigurations. This means that DCI with the short-latency reconfiguration will be only detected by the UEs with the special RNTI, the special RNTI differing from the remaining RNTIs employed for UEs or groups of UEs.

Moreover, advantageously, the special subframe configuration and the uplink/downlink configuration are carried in a first field specifying which subframes are special subframes and a second field specifying for the special subframes which symbols belong to uplink and which symbols belong to downlink.

For example, the DCI carrying the short-latency reconfiguration may for this purpose comprise the first field specifying which subframes are short-TTI special subframes (i.e., special subframes supporting short TTIs, i.e., TTIs shorter than TTI used for the uplink and downlink subframes). The first field may have length of 6 or less bits per radio frame, depending on the number of configurations provided in the set of selectable configurations (such as the tables in FIG. 5 or 12). The first field should not need more than 10 bits when we assume that subframe pattern defined by the first field represents one subframe per bit, and the pattern repeats every 10 ms. An advantage of such a 10-bit field is that it can be used to indicate not only whether a special subframe is configured as a short-TTI special subframe, but could even indicate whether regular downlink or uplink subframes are configured as a short-TTI subframe. However when only subframes configurable for MBSFN plus subframes #1 and #6 are potential short-TTI special subframes, only 7 subframes are such candidates and therefore a first field size of 7 bits for a 10 ms pattern are necessary. In fact, when employing the embodiment that only subframes configurable as MBSFN plus subframe #6 of a radio frame (i.e., only subframes #3, #4, #6,#7, #8,#9) are configurable as additional special subframes, and if only the additional special subframes are available for short-TTI transmissions, then a first field containing 6 bits would be sufficient to define a 10 ms pattern that repeats every 10 ms, which is aligned with the MBSFN pattern repeating every 10 ms. An alternative additional special subframe pattern could be likewise defined for the case that the MBSFN configuration repeats every 40 ms, in which case a first field of length 24 bits would be sufficient to represent each additional special subframe candidate in a 40 ms period. The size of the first field may be further reduce to 5 bits in a 10 ms pattern (or 20 bits in a 40 ms pattern) if only subframes configurable as MBSFN of a radio frame are configurable as short-TTI special subframes.

The DCI carrying the short-latency reconfiguration may further comprise the second field specifying the special subframe configuration, i.e., the number of symbols for the uplink portion and the number of symbols for downlink portion. The second field may have length of 6 or less bits. 7 bits should be sufficient to provide sufficient flexibility (cf. Tables in FIGS. 6 and 8).

FIG. 13 illustrates flow diagrams of methods according to an embodiment.

A method 1300B may be performed at a terminal (user equipment). The method 1300B is designed for transmitting data in a frame with subframes of a wireless communication system, each subframe being either an uplink subframe accommodating uplink signal, a downlink subframe accommodating downlink signal or a special subframe including a downlink signal portion as well as an uplink signal portion. The method includes a step of receiving 1310 a control signal including a special subframe configuration specifying the length of the uplink and/or downlink portion of the special subframe. As described above, the reception of the configuration may be performed semi-statically and/or dynamically. For instance, the configuration is initially received via cell broadcast over RRC system information. Later, the (re)configuration 1310 may be performed dynamically by DCI, for instance on the PDCCH in LTE. However, the present disclosure is not limited to dynamical signaling. The (re)configuration may alternatively or in addition be conveyed via RRC protocol (semi-statically). The configuration may apart from the special subframe configuration also include the uplink/downlink configuration as exemplified above. The UE upon receiving the configuration applies the configuration to its further transmissions and receptions.

In particular, the method 1300B further comprises a step of mapping 1320 user data and/or control data including feedback information in a transmission time interval, TTI, onto one subframe. Moreover, the length of a second TTI for mapping onto the uplink portion of a special subframe is shorter than a first TTI for mapping onto an uplink subframe, or a first number of TTIs mapped onto the uplink subframe is larger than a second number of TTIs for mapping onto the uplink portion of a special subframe. In other words, the received configuration determines the symbols which may be used for uplink and, according to the TTI length to be applied, the user data and/or the control data to be transmitted in the uplink, are mapped to the resource grid. The mapped data within a radio frame are then transmitted 1330 over the wireless interface channel 1300.

It is noted that the configuration received in step 1310 may also be applied to the data reception at the terminal. In particular, the UE may perform the step of receiving 1395 a radio frame in which downlink data are conveyed including downlink user data and downlink control data (for instance PDSCH and PDCCH in LTE). The data are demapped 1390 from the received frame according to the received configuration of uplink/downlink subframes and/or special subframes and/or TTI length/number.

Another method 1300A is provided for receiving data in a frame with subframes of a wireless communication system, each subframe being either an uplink subframe accommodating uplink signal, a downlink subframe accommodating downlink signal or a special subframe including a downlink signal portion as well as an uplink signal portion. The method 1300A may be performed at the base station (eNB in LTE) and includes a step of transmitting 1370 a control signal including a special subframe configuration specifying the length of the uplink and/or downlink portion of the special subframe. The configuration which is transmitted is selected 1360 beforehand by the base station, for instance based on configuration received from another network entity, or based on the traffic in the cell or based on the services to be conveyed in the cell or based on the user profiles, or the like. Specifically, it is beneficial to consider the shortest possible guard period that is able to support the required time advance offset for uplink transmissions by a UE, as well as quality of service (QoS) requirements regarding latency of a service.

The method 1300A further comprises a step of receiving 1340 data mapped on special subframes according to the special subframe configuration. In other words, the base station receives uplink radio frame including the data from the terminal mapped and transmitted as described above with reference to the method 1300B, steps 1310-1330.

After receiving the frame 1340, a step of demapping 1350 is performed to demap user data and/or control data including feedback information in a transmission time interval, TTI, from one subframe, wherein the length of a second TTI for mapping onto the uplink portion of a special subframe is shorter than a first TTI for mapping onto an uplink subframe, or a first number of TTIs mapped onto the uplink subframe is larger than a second number of TTIs for mapping onto the uplink portion of a special subframe. It is noted that the step of demapping 1350 applies the configuration selected 1360 by the base station, transmitted 1370 to the UE and applied 1320 by the UE.

Moreover, the base station may employ the selected configuration also to transmission of data. In particular, the method may further include a step of mapping 1380 the data to be transmitted to the UE based on the selected configuration which has also been transmitted 1370 to the UE. After the mapping 1380, the frame with the mapped data is transmitted 1385 to the UE.

In accordance with another embodiment, a computer program product comprising a computer-readable medium having a computer-readable program code embodied thereon is provided, the program code being adapted to carry out the present disclosure.

Other exemplary embodiments relate to the implementation of the above described various embodiments using hardware and software. In this connection a user terminal (mobile terminal) and an eNodeB (base station) are provided. The user terminal and base station are adapted to perform the methods described herein, including corresponding entities to participate appropriately in the methods, such as receiver, transmitter, processors.

It is further recognized that the various embodiments may be implemented or performed using computing devices (processors). A computing device or processor may, for example, be general purpose processors, digital signal processors (DSP), application specific integrated circuits (ASIC), field programmable gate arrays (FPGA) or other programmable logic devices, etc. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

Summarizing, the present disclosure relates to receiving and transmitting data in a frame with subframes of a wireless communication system, each subframe being either an uplink subframe accommodating uplink signal, a downlink subframe accommodating downlink signal or a special subframe including a downlink signal portion as well as an uplink signal portion. A control signal includes a special subframe configuration specifying the length of the uplink and/or downlink portion of the special subframe. The mapping and demapping of user data and/or control data including feedback information in a transmission time interval, TTI, onto or from one subframe is then performed, wherein the length of a second TTI for mapping onto the uplink portion of a special subframe is shorter than a first TTI for mapping onto an uplink subframe, or a first number of TTIs mapped onto the uplink subframe is larger than a second number of TTIs for mapping onto the uplink portion of a special subframe. The data are received or transmitted accordingly.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for transmitting data in a frame with subframes of a wireless communication system, each subframe being either an uplink subframe accommodating an uplink signal, a downlink subframe accommodating a downlink signal or a special subframe including a downlink signal portion as well as an uplink signal portion, the apparatus comprising:
   a receiver for receiving a control signal including a special subframe configuration specifying a length of the uplink and/or downlink portion of the special subframe;
   mapping circuitry, coupled to the receiver and configured to map user data and/or control data including feedback information in a transmission time interval (TTI) onto one subframe; and
   a transmitter for transmitting the mapped user data and control data,
   wherein a second TTI for the uplink portion of the special subframe is shorter than a first TTI for the uplink subframe, and the special subframe configuration takes a value out of:
   a first value indicating a length of the uplink portion of the special subframe which is not sufficient to accommodate the user data in the second TTI, and
   a second value indicating a length of the uplink portion of the special subframe which is sufficient to accommodate the user data in the second TTI.

2. The apparatus according to claim 1, wherein the mapping circuitry is configured to:
   map onto the uplink portion physical layer signals including sounding reference signals if the special subframe configuration takes the first value; and
   map onto the uplink portion control data including positive or negative acknowledgements for downlink data and/or channel state information if the special subframe configuration takes the second value; or
   map onto the uplink portion user data if the special subframe configuration takes the second value.

3. The apparatus according to claim 1, wherein
each special subframe consists of a plurality of symbols and the special subframe configuration indicates the number of symbols for the downlink portion and/or for the uplink portion, and
the special subframe further comprises a guard period separating the downlink portion and the uplink portion.

4. The apparatus according to claim 1,
wherein the special subframe configuration takes a value out of a value set, wherein some values in the value set differ with respect to the length of the downlink portion, the length of the uplink portion, or the length of the TTI.

5. The apparatus according to claim 1, wherein
the control signal further comprises an uplink/downlink configuration specifying for each subframe of a frame whether it is a downlink, uplink or special subframe, and
the uplink/downlink configuration includes a first set of subframes that are configurable for multicast or broadcast, and a second set of subframes that are not configurable for multicast or broadcast.

6. The apparatus according to claim 5, wherein the special subframe configuration differs for the first and the second sets of subframes of the uplink/downlink configuration.

7. The apparatus according to claim 5, wherein
the wireless communication system is a long term evolution (LTE),
the first set of subframes are from among those subframes that are configurable as multicast broadcast single-frequency network (MBSFN) subframes, and/or
the second set of subframes are subframes with number 1 and/or 6.

8. The apparatus according to claim 5, wherein the special subframe configuration and the uplink/downlink configuration are carried in a first field specifying which subframes are special subframes and a second field specifying for the special subframes which symbols belong to uplink and which symbols belong to downlink.

9. The apparatus according to claim 1, wherein the length of the TTI differs for the uplink portion of the special subframe and the downlink portion of the special subframe.

10. The apparatus according to claim 1, wherein the control signal carrying the special subframe configuration is transmitted within downlink control information as layer 1/layer 2 signaling.

11. The apparatus according to claim 1, wherein the uplink portion of the special subframe consists of a data portion onto which the user data and/or control data is mapped within one or more TTIs and a signal portion which carries a sounding reference signal and/or a random access channel preamble.

12. An apparatus for receiving data in a frame with subframes of a wireless communication system, each subframe being either an uplink subframe accommodating an uplink signal, a downlink subframe accommodating a downlink signal or a special subframe including a downlink signal portion as well as an uplink signal portion, the apparatus comprising:
a transmitter for transmitting a control signal including a special subframe configuration specifying a length of the uplink and/or downlink portion of the special subframe;
a receiver for receiving data mapped on special subframes according to the special subframe configuration; and
mapping circuitry, coupled to the receiver and configured to demap user data and/or control data including feedback information in a transmission time interval (TTI) from one subframe, wherein
a second TTI for the uplink portion of the special subframe is shorter than a first TTI for the uplink subframe, and the special subframe configuration takes a value out of:
a first value indicating a length of the uplink portion of the special subframe which is not sufficient to accommodate the user data in the second TTI, and
a second value indicating a length of the uplink portion of the special subframe which is sufficient to accommodate the user data in the second TTI.

13. A method for transmitting data in a frame with subframes of a wireless communication system, each subframe being either an uplink subframe accommodating an uplink signal, a downlink subframe accommodating a downlink signal or a special subframe including a downlink signal portion as well as an uplink signal portion, the method comprising:
receiving a control signal including a special subframe configuration specifying a length of the uplink and/or downlink portion of the special subframe;
mapping user data and/or control data including feedback information in a transmission time interval (TTI) onto one subframe; and
transmitting the mapped user data and/or control data,
wherein a second TTI for the uplink portion of the special subframe is shorter than a first TTI for the uplink subframe, and the special subframe configuration takes a value out of:
a first value indicating a length of the uplink portion of the special subframe which is not sufficient to accommodate the user data in the second TTI, and
a second value indicating a length of the uplink portion of the special subframe which is sufficient to accommodate the user data in the second TTI.

14. A method for receiving data in a frame with subframes of a wireless communication system, each subframe being either an uplink subframe accommodating an uplink signal, a downlink subframe accommodating a downlink signal or a special subframe including a downlink signal portion as well as an uplink signal portion, the method comprising:
transmitting a control signal including a special subframe configuration specifying a length of the uplink and/or downlink portion of the special subframe;
receiving data mapped on special subframes according to the special subframe configuration; and
demapping user data and/or control data including feedback information in a transmission time interval (TTI) from one subframe, wherein
a second TTI for the uplink portion of the special subframe is shorter than a first TTI for the uplink subframe, and the special subframe configuration takes a value out of:
a first value indicating a length of the uplink portion of the special subframe which is not sufficient to accommodate the user data in the second TTI, and
a second value indicating a length of the uplink portion of the special subframe which is sufficient to accommodate the user data in the second TTI.

* * * * *

UNITED STATES PATENT AND TRADEMARK OFFICE
CERTIFICATE OF CORRECTION

| | | |
|---|---|---|
| PATENT NO. | : 11,160,072 B2 | Page 1 of 1 |
| APPLICATION NO. | : 16/089279 | |
| DATED | : October 26, 2021 | |
| INVENTOR(S) | : Golitschek Edler von Elbwart et al. | |

It is certified that error appears in the above-identified patent and that said Letters Patent is hereby corrected as shown below:

On the Title Page

"(73) Assignee: Panasonic Intellectual Property Corporalion of America, Torrance, CA (US)"
Should read:
--(73) Assignee: Panasonic Intellectual Property Corporation of America, Torrance, CA (US)--.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*